United States Patent [19]

Noguchi et al.

[11] 4,066,043
[45] Jan. 3, 1978

[54] FUEL REFORMING SYSTEM FOR AN INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 662,254

[22] Filed: Feb. 27, 1976

Related U.S. Application Data

[62] Division of Ser. No. 487,785, July 11, 1974.

[30] Foreign Application Priority Data

| July 26, 1973 | Japan | 48-84345 |
| July 26, 1973 | Japan | 48-84348 |
| Nov. 15, 1973 | Japan | 48-128617 |
| Nov. 19, 1973 | Japan | 48-129988 |
| Nov. 20, 1973 | Japan | 48-130905 |
| Mar. 12, 1974 | Japan | 49-28876 |

[51] Int. Cl.$^2$ ............................................. F02B 43/08
[52] U.S. Cl. ..................................... 123/3; 123/122 G
[58] Field of Search .......... 123/1 A, 3, 119 E, 122 G, 123/127, 180 R, 75 B, 32 SP, 32 ST, 142, 191 S, 191 SP; 48/212

[56] References Cited

U.S. PATENT DOCUMENTS

| 1,687,918 | 10/1928 | Woolson | 123/122 G |
| 1,711,938 | 5/1929 | Good | 123/122 G |
| 1,803,684 | 5/1931 | Woolson | 123/122 G |
| 2,225,647 | 12/1940 | Liekendael | 123/122 G |
| 2,401,862 | 6/1946 | Dugas | 123/122 G |
| 2,613,144 | 10/1972 | Carnahan | 123/142 |
| 3,171,395 | 3/1965 | Bartholomew | 123/127 |
| 3,633,553 | 1/1972 | Holzapfel | 123/75 B |
| 3,688,755 | 9/1972 | Grayson et al. | 123/3 |
| 3,828,736 | 8/1972 | Koch | 123/3 |
| 3,897,225 | 7/1975 | Henkel et al. | 123/3 |

*Primary Examiner*—Ronald H. Lazarus
*Assistant Examiner*—David D. Reynolds
*Attorney, Agent, or Firm*—Cushman, Darby & Cushman

[57] ABSTRACT

A fuel reforming system for use in an intake system for an internal combustion engine operable with a hydrocarbon fuel has a spark plug or plugs for intermittently producing spark discharges to cause imperfect combustion of a rich air-fuel mixture so that a part of the fuel is reformed into intermediate combustion products and the large portion of the remainder of the fuel is vaporized by the heat produced by the imperfect combustion, whereby the reformed mixture is made optimum for combustion to thereby enable the engine to perform an optimum operation.

9 Claims, 46 Drawing Figures

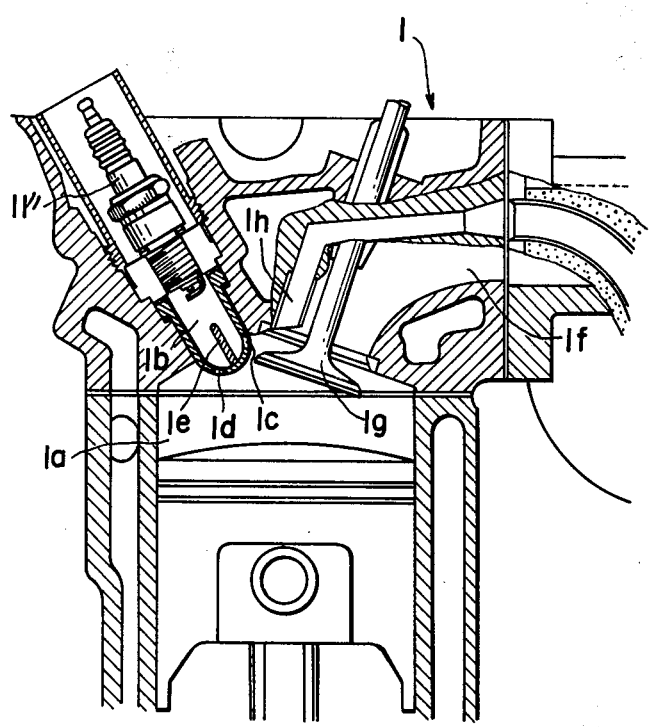
FIG. IA

FUEL REFORMING SYSTEM FOR AN INTERNAL COMBUSTION ENGINE

This is a division, of application Ser. No. 487,785 filed July 11, 1974.

The present invention relates to a fuel reforming system for use in an intake system of an interned combustion engine which is operable with a hydrocarbon fuel such as, for example, gasoline. More particularly, the invention is concerned with a system for reforming a part of the fuel mixture into readily combustible compounds by causing imperfect combustion of a rich air-fuel mixture by means of a discharge of a spark plug and for facilitating vaporization of the large portion of the remainder of the fuel to thereby improve the distribution of the mixture to intake manifolds of the engine and the transition response of the engine and facilitate improved controlled combustion process in engine cylinders.

In order to obtain a proper operation of an internal combustion engine, it is required to properly introduce an air-fuel mixture into an engine cylinder or cylinders. Recently, stratified charge combustion systems have been proposed particularly in an attempt to reduce the harmful elements of exhaust gases from internal combustion engines. In order to effectively achieve a stratified charge combustion in an engine, it is required to properly introduce a rich air- fuel mixture to a cylinder or cylinders and uniformly distribute the rich mixture to the cylinders. This is because the rich air-fuel mixture contains a large percentage of fuel and a substantial part of the fuel is in its liquid phase which gives rise to a problem that the liquid fuel is adhered to the inner walls of fuel passages and flows on the passage walls and the inner peripheral walls of the cylinders.

Heretofore, the proper introduction of a rich mixture into engine cylinders and the uniform distribution of the mixture to respective cylinders have conventionally been performed by the heating of the rich mixture by means of the exhaust gas or warmed cooling water to vaporize the liquid fuel contained in the mixture. This, however, has failed to perfectly vaporize the fuel. Particularly, in the starting operation of the engine, the conventional method has been almost unable to vaporize the fuel because the exhaust gas and the cooling water are both at lower temperatures at that time.

In view of the above, the fuel reforming system according to the present invention is characterized by a feature that the system comprises at least one spark plug for producing a spark discharge which causes imperfect combustion of a rich mixture of air and a fuel to reform a part of the fuel and vaporize the large portion of the remainder of the fuel by means of the heat of reaction at that time. The words "imperfect combustion" are used to generally means clacking (chemical bond rupture) and/or partial oxidization to be referred to later.

In the system of the present invention, flame arrester means may preferably be provided for preventing a flame produced by a spark plug from propagating beyond a predetermined range. In order to secure reliable reformation and vaporization of the fuel by means of the imperfect combustion of the rich mixture throughout all of the operating conditions of an associated internal combustion engine, the system may preferably include a secondary air intake pipe having an open end disposed upstream of the spark plug in a passage for the rich mixture. The amount of the secondary air to be fed to the rich mixture passage may preferably be controlled in accordance with the vacuum within the rich mixture passage. Alternatively, the spark plug or the secondary air supply may be controlled in accordance with either the warming-up state of the engine or the temperature of a reformed rich mixture.

In an embodiment of the present invention, an oxidized catalyst bed is provided in the rich mixture passage downstream of the spark plug so that the reformation of the rich mixture is also facilitated by the catalyst. Preferably, water may be supplied to the catalyst bed to maintain the catalyst bed within an optimum range of temperature.

It is an object of the present invention to achieve a proper introduction of a mixture of air and fuel into cylinders of an internal combustion engine for thereby obtaining a proper combustion of the mixture in the engine (i.e., uniform distribution of the mixture to respective engine cylinders, proper ignition and combustion of the mixture, reduction in harmful exhaust emission and improvement in the transition response of the engine).

It is another object of the present invention to keep the reformation and vaporization of the fuel at a substantially constant extent throughout all of the operating conditions of the engine for thereby effectively obtaining a further reliable proper combustion of the mixture.

It is a still another object of the present invention to stop the discharge of a spark plug or the supply of a secondary air when a condition is reached that the discharge of the spark plug becomes unnecessary for the proper vaporization of the fuel, to thereby prevent the mixture from reaching an unduly high temperature.

It is a further object of the present invention to rely not only on the discharge of a spark plug or plugs but also on a catalytic reaction to reform and vaporize the fuel for thereby achieving a further reliable optimum combustion of the mixture.

The present invention will be described by way of example with reference to the accompanying drawings.

FIG. 1A is a fragmentary sectional elevation of a stratified internal combustion engine;

Figure 7:
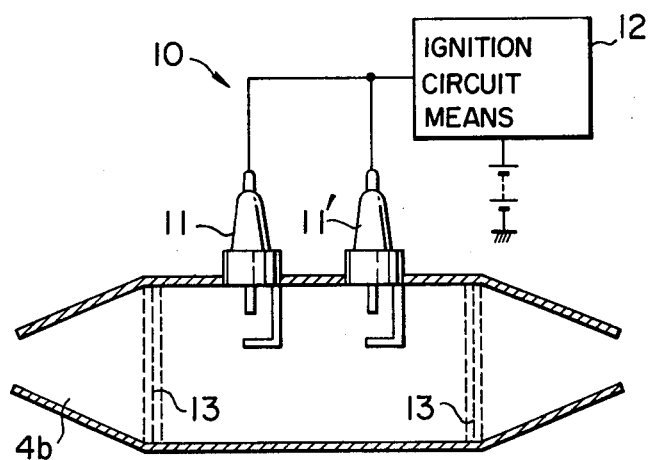
Figure 4:
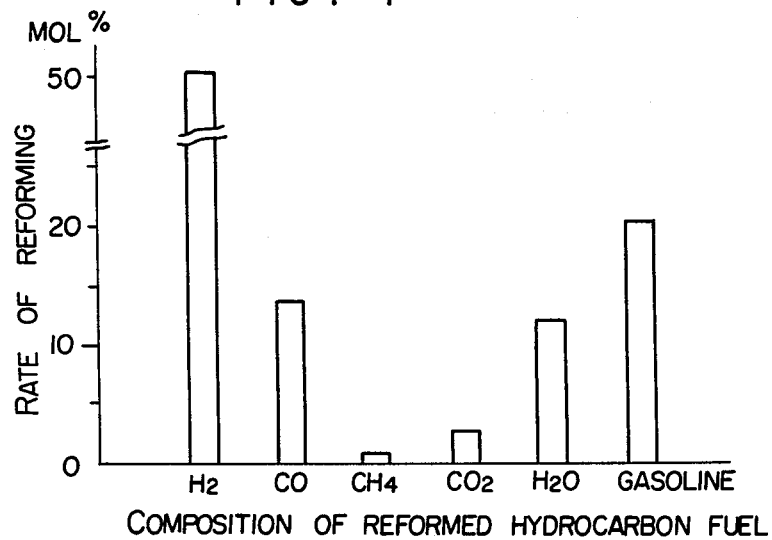
Figure 5:
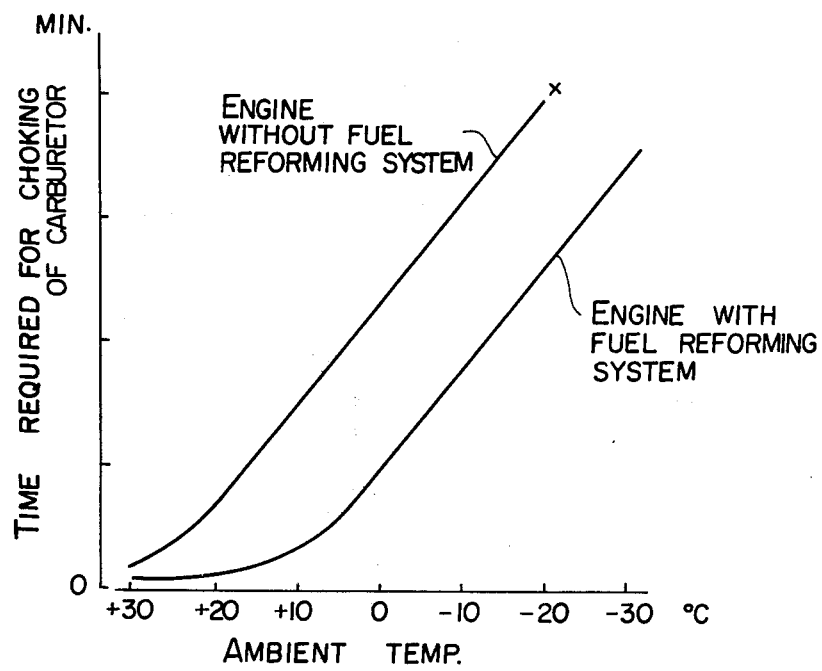
Figure 6A:
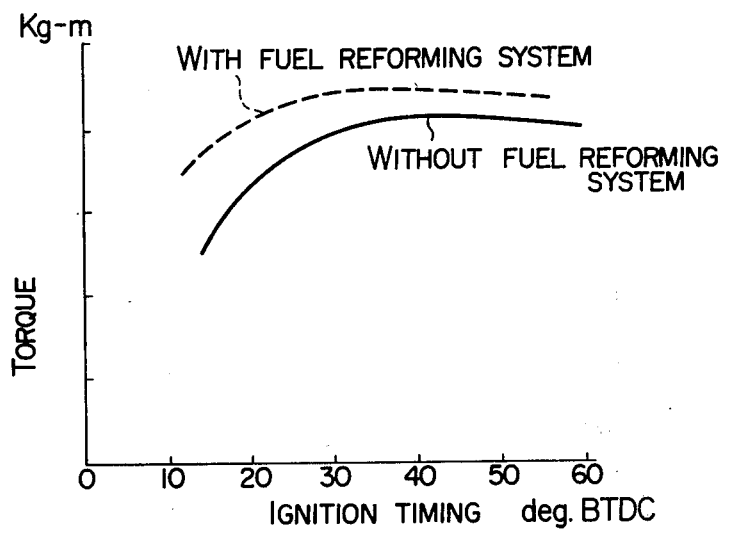
Figure 6B:
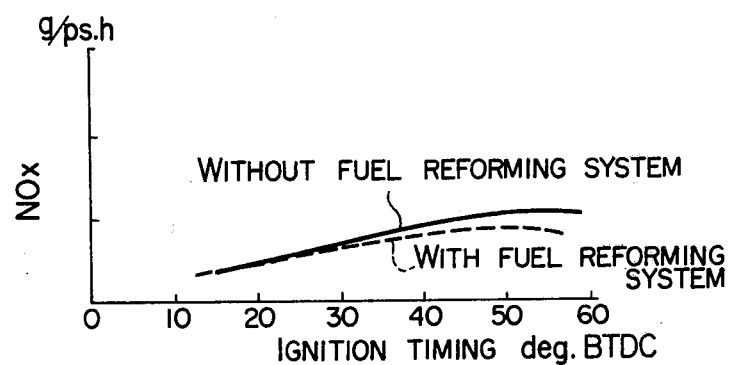
Figure 6C:
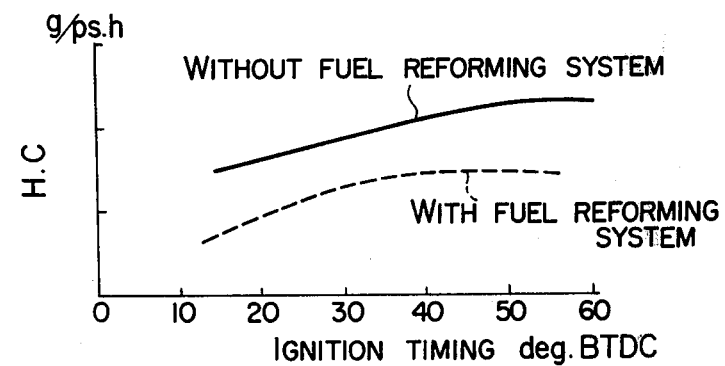
Figure 8:
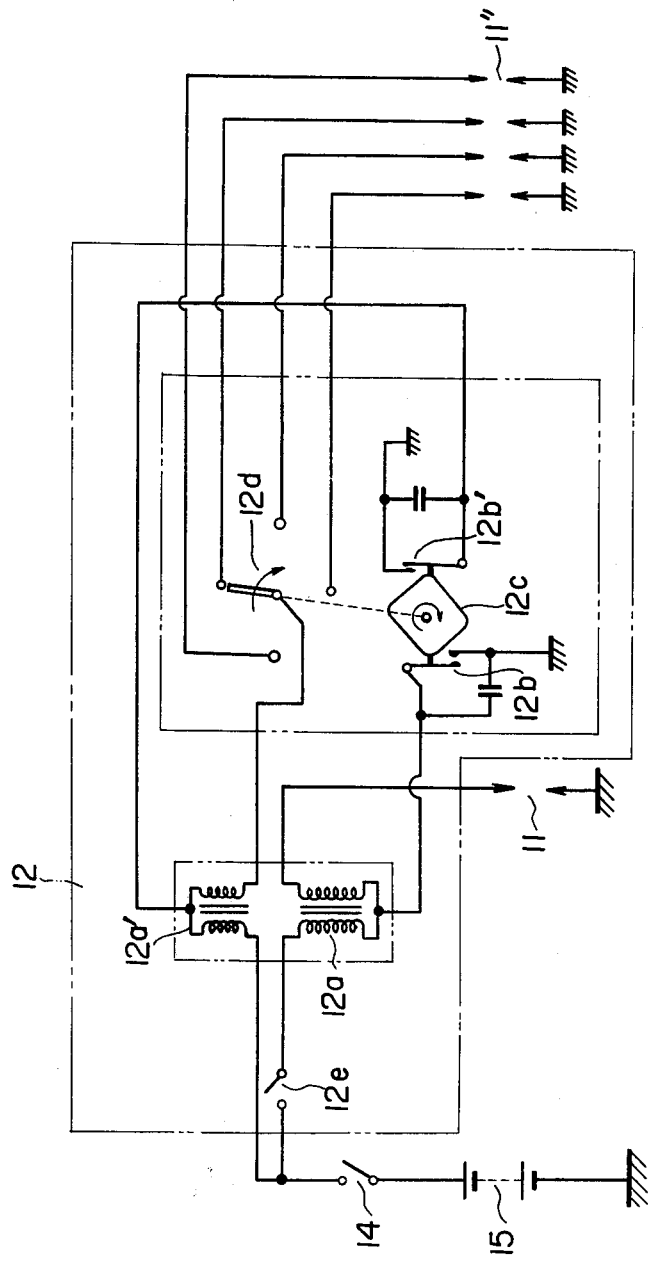
Figure 9A:
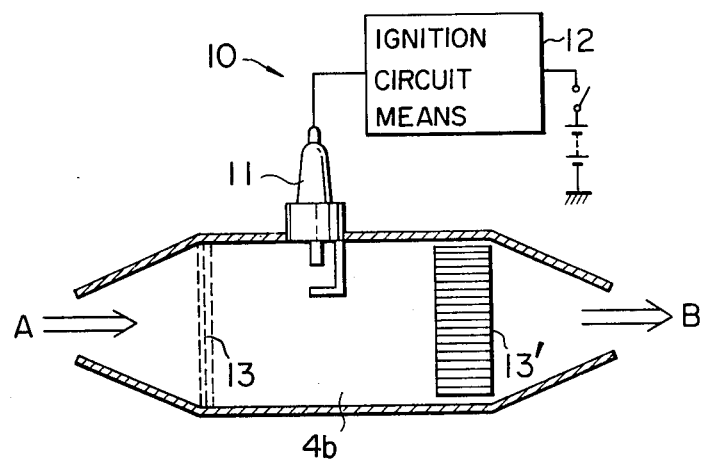
Figure 9B:
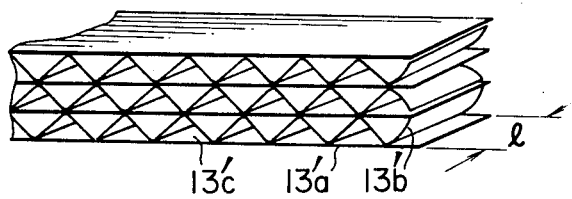
Figure 10A:
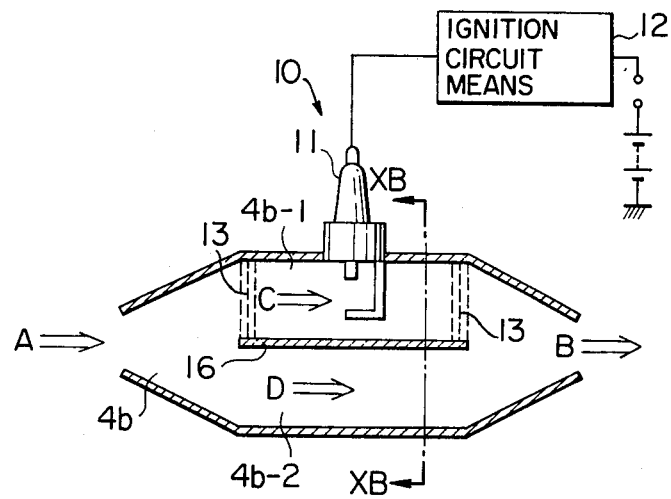
Figure 10B:
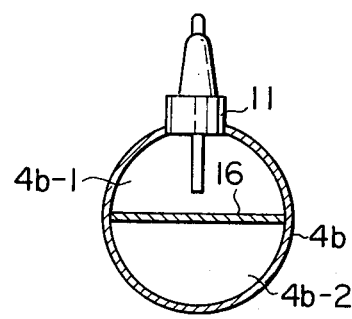
Figure 11A:
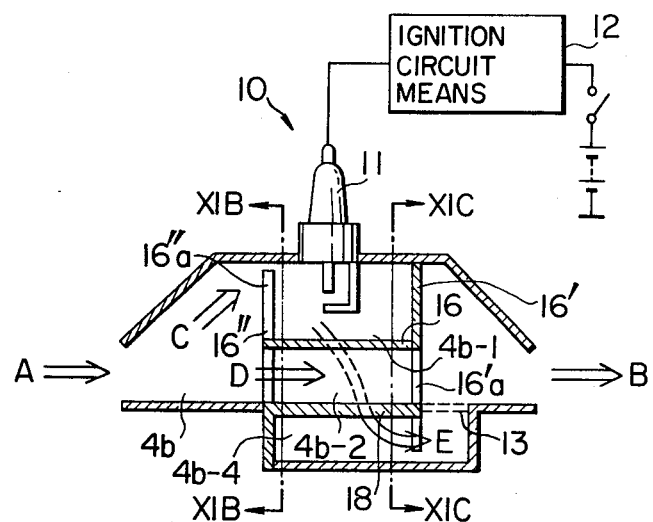
Figure 11B:
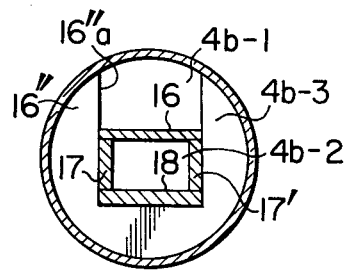
Figure 11C:
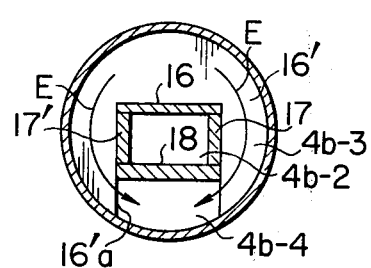
Figure 12:
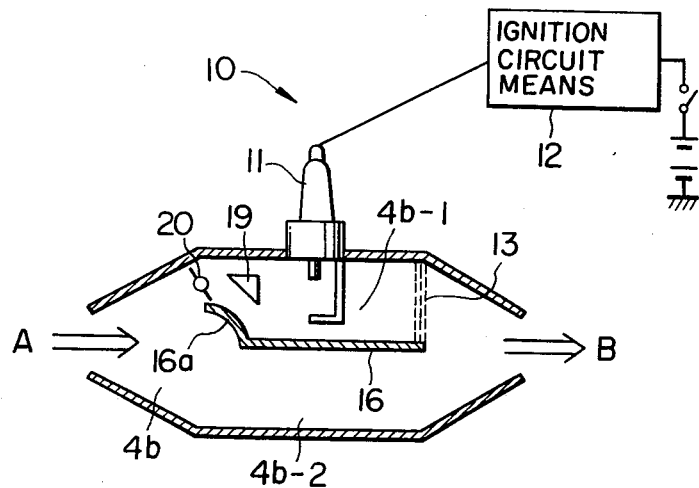
Figure 13:
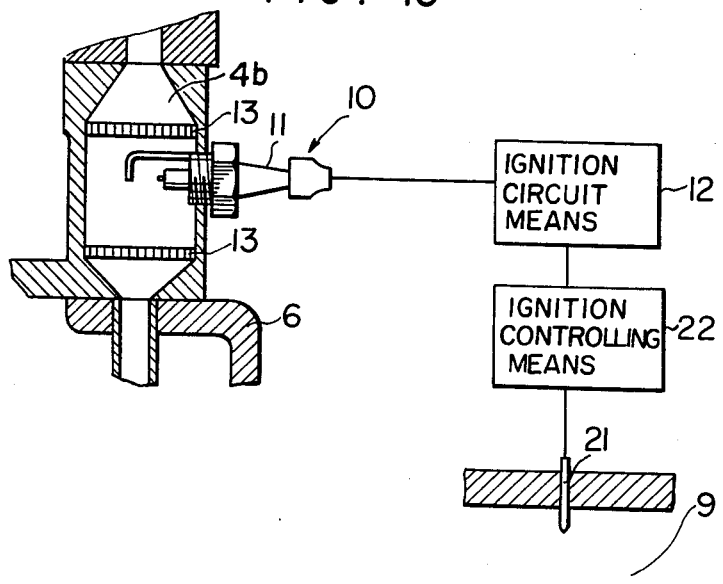
Figure 14:
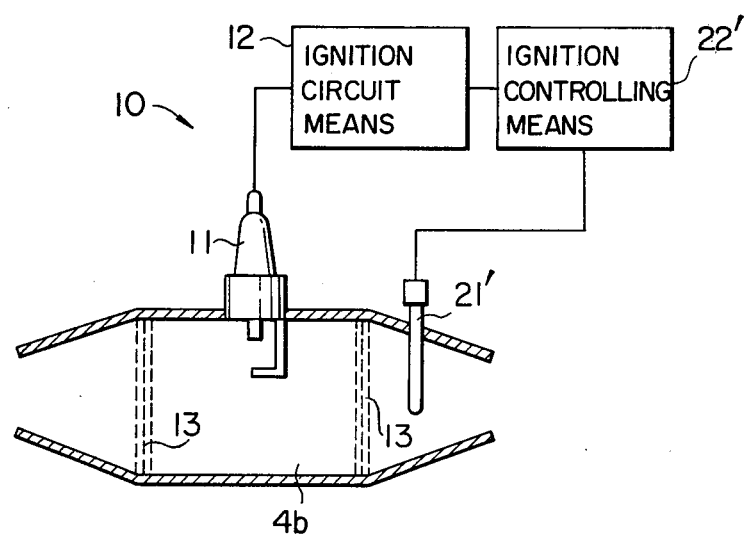
Figure 15:
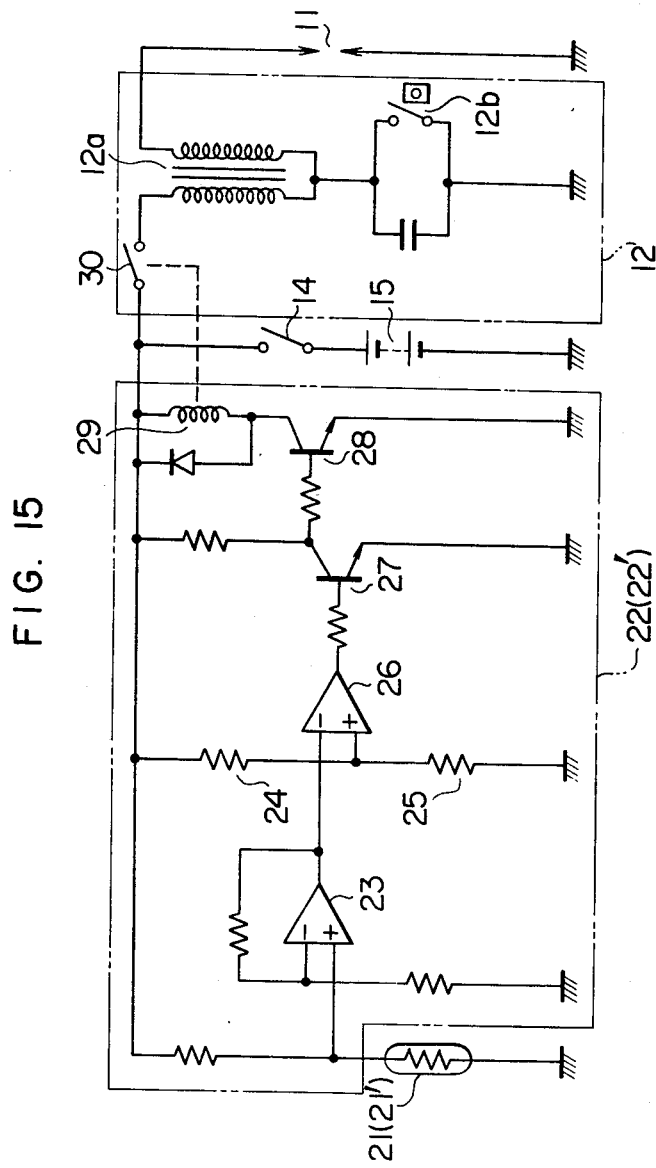
Figure 16:
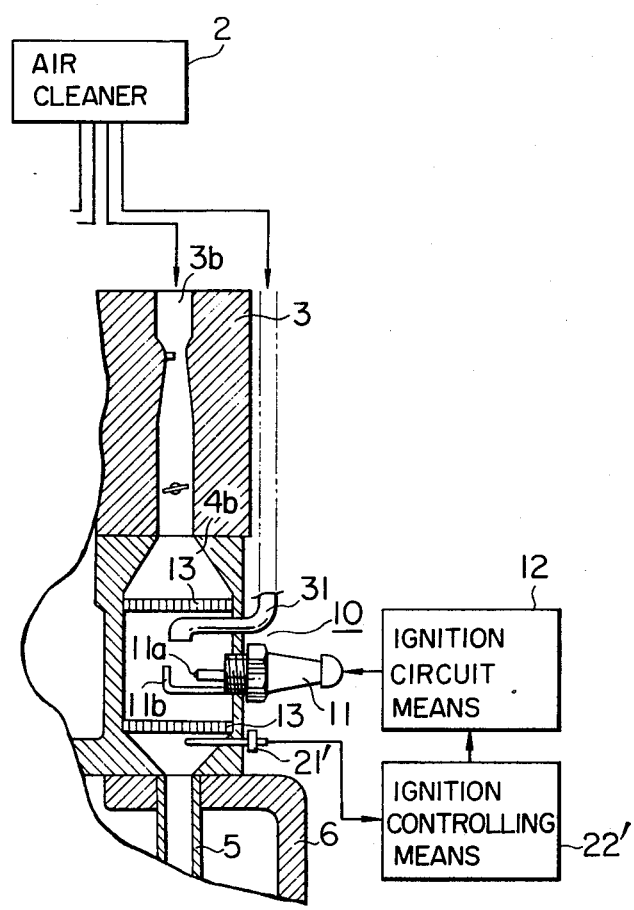
Figure 17:
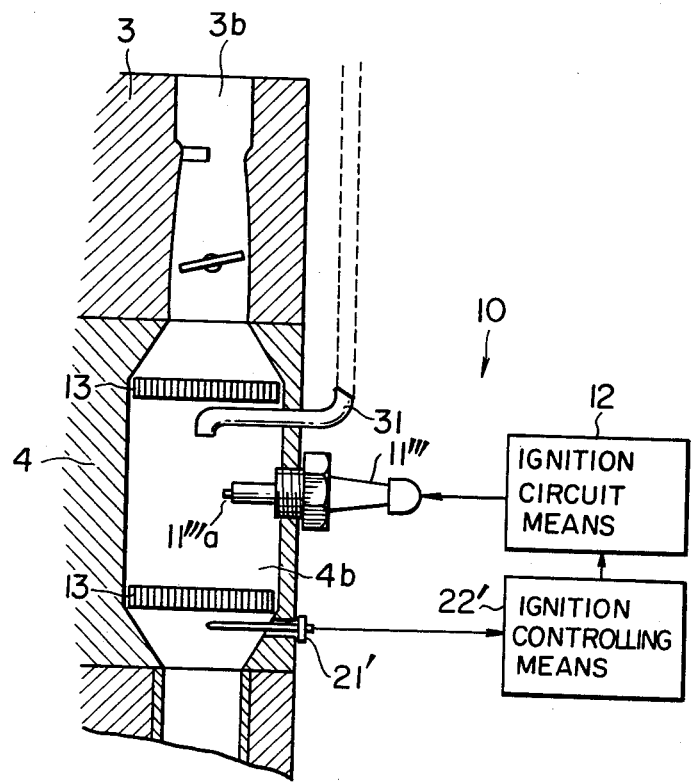
Figure 18:
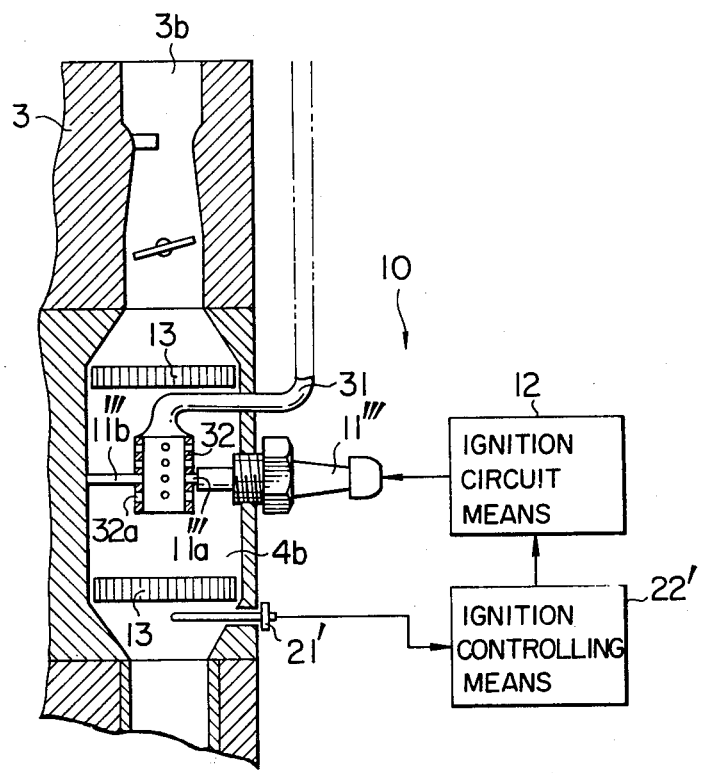
Figure 21A:
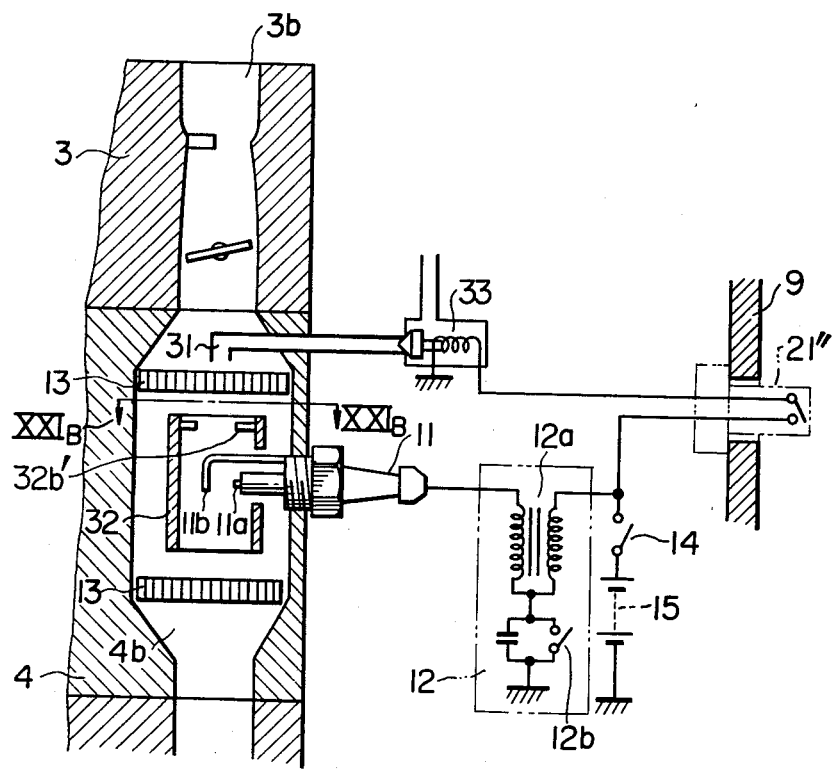
Figure 21B:
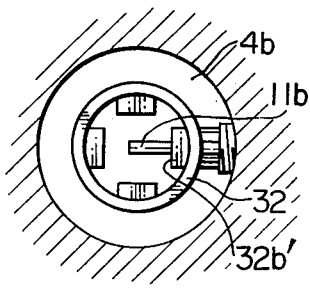
Figure 22:
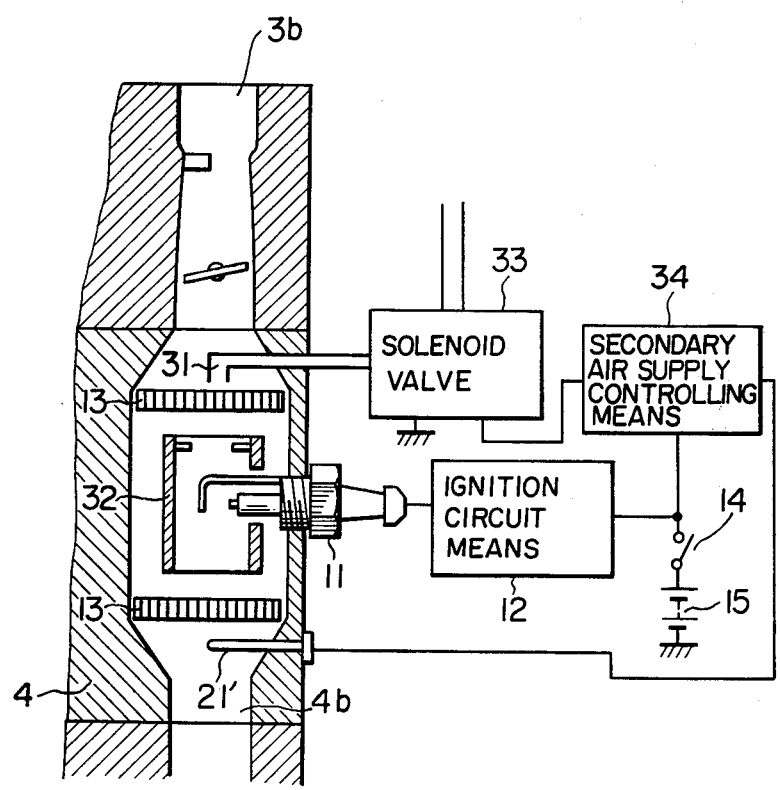
Figure 23:
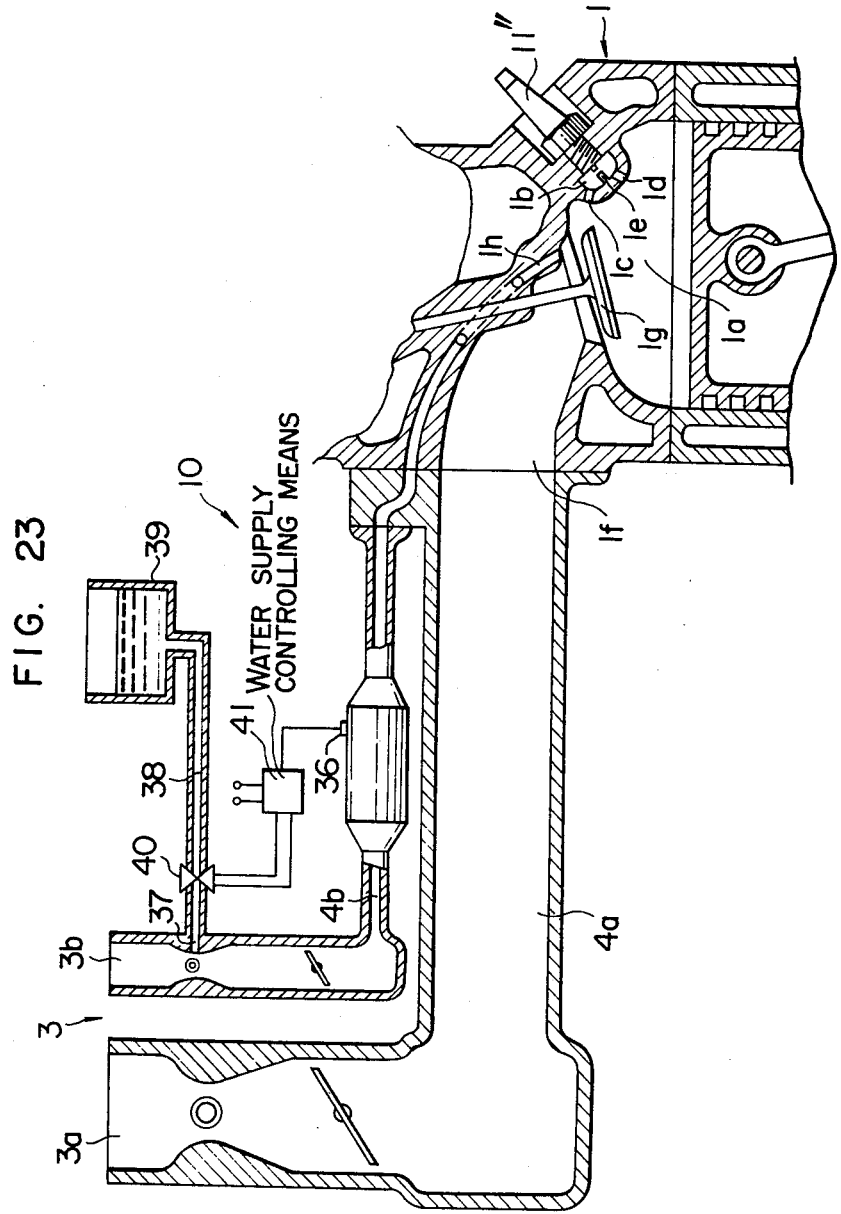
Figure 24:
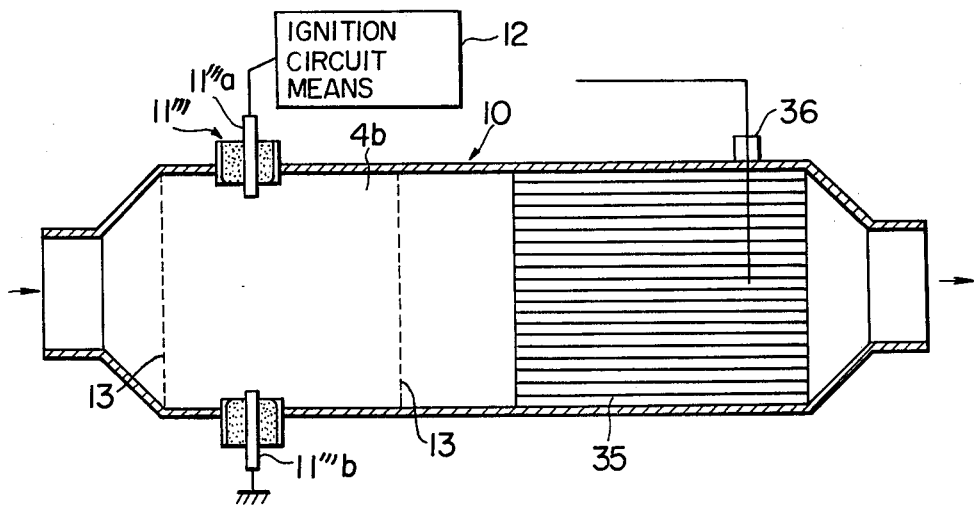
Figure 25:
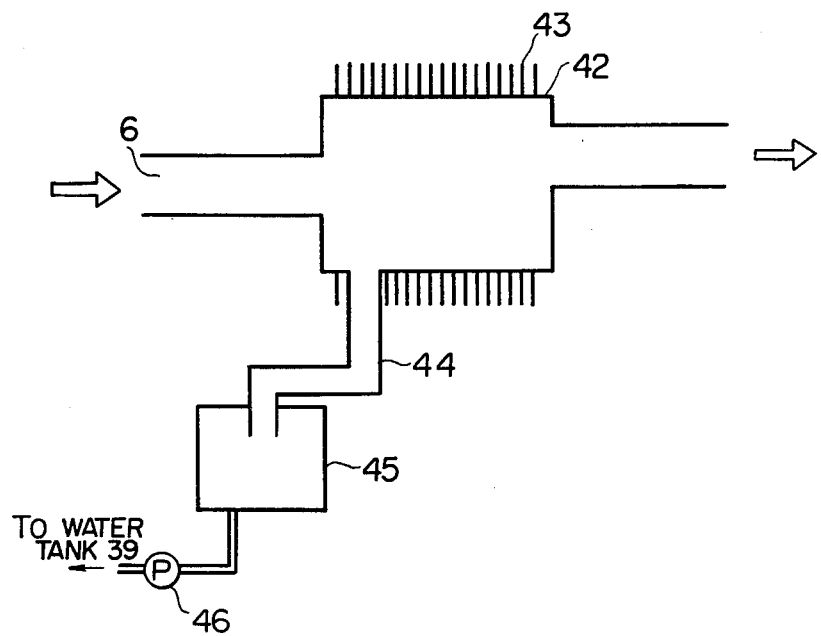

FIG. 4 graphically illustrates the composition of a fuel reformed by the fuel reforming system according to the present invention;

FIG. 5 is a graphic illustration of the results of tests regarding starting abilities of engines with and without the fuel reforming system according to the present invention, respectively;

FIGS. 6A to 6C graphically illustrate the results of tests regarding torque on shaft relative to ignition timing, $NO_x$ emission relative to ignition timing, and H.C. emission relative to ignition timing of engines with and without the fuel reforming system according to the present invention, respectively;

FIG. 7 is a diagrammatic view illustrating a modification of the first embodiment of the fuel reforming system according to the present invention;

FIG. 8 is a circuit diagram of an ignition circuit means illustrating another modification of the first embodiment of the fuel reforming system according to the present invention;

FIG. 9A is a diagrammatic sectional view of a further modification of the first embodiment of the fuel reforming system according to the present invention;

FIG. 9B is perspective view of a flame arrester used in the modification shown in FIG. 9A;

FIG. 10A is a diagrammatic sectional view of a second embodiment of the fuel reforming system according to the present invention;

FIG. 10B is a sectional view taken along line XB—XB in FIG. 10A;

FIG. 11A is a diagrammatic sectional view of a modification of the second embodiment of the fuel reforming system according to the present invention;

FIGS. 11B and 11C are sectional views taken along lines XIB—XIB and XIC—XIC in FIG. 11A, respectively;

FIG. 12 is a diagrammatic sectional view of another modification of the second embodiment of the fuel reforming system according to the present invention;

FIG. 13 is a diagrammatic sectional view of a third embodiment of the fuel reforming system according to the present invention;

FIG. 14 is a diagrammatic sectional view of a modification of the third embodiment of the fuel reforming system according to the present invention;

FIG. 15 is a circuit diagram showing an example of the structures of ignition controlling means shown in FIGS. 13 and 14;

FIG. 16 is a diagrammatic sectional view of a fourth embodiment of the fuel reforming system according to the present invention;

FIG. 17 is a diagrammatic sectional view of a modification of the fourth embodiment of the fuel reforming system according to the present invention;

FIG. 18 is a diagrammatic sectional view of a fifth embodiment of the fuel reforming system according to the present invention;

FIGS. 19A to 19D are diagrammatic fragmentary sectional views of modifications of the fifth embodiment of the fuel reforming system according to the present invention;

FIGS. 20A to 20J illustrate modifications of a mixer used in the fifth embodiment of the fuel reforming system according to the present invention, wherein the figures are plan views and axial sectional side elevations of the modified mixers, respectively;

FIG. 21A is a diagrammatic sectional view of a sixth embodiment of the fuel reforming system according to the present invention;

FIG. 21B is a section taken along line XXIB—XXIB in FIG. 21A;

FIG. 22 is a diagrammatic sectional view of a modification of the sixth embodiment of the fuel reforming system according to the present invention;

FIG. 23 is a diagrammatic sectional view showing a seventh embodiment of the fuel reforming system according to the present invention applied to a stratified combustion engine;

FIG. 24 is an enlarged diagrammatic view of the seventh embodiment of the fuel reforming system according to the present invention showing the details of the embodiment; and FIG. 25 is a diagrammatic illustration of means in the seventh embodiment of the invention for condensing and collecting water contained in exhaust gases from the interned combustion engine.

The fuel reforming system according to the present invention can be applied to a rich mixture intake system of any type of stratified combustion engine which is supplied with two kinds of, i.e., rich and lean airfuel mixtures provided that the engine is operable with a hydrocarbon fuel. The fuel reforming system can also be used with a conventional internal combustion engine if the engine is modified such that a rich mixture produced by a carburetor or a fuel injection device is supplied with a fresh air on the way to cylinders to thereby form a proper air-fuel mixture. Examples of the application of the fuel reforming system according to the present invention to internal combustion engines are illustrated in FIGS. 1 to 2B.

Figure 1:
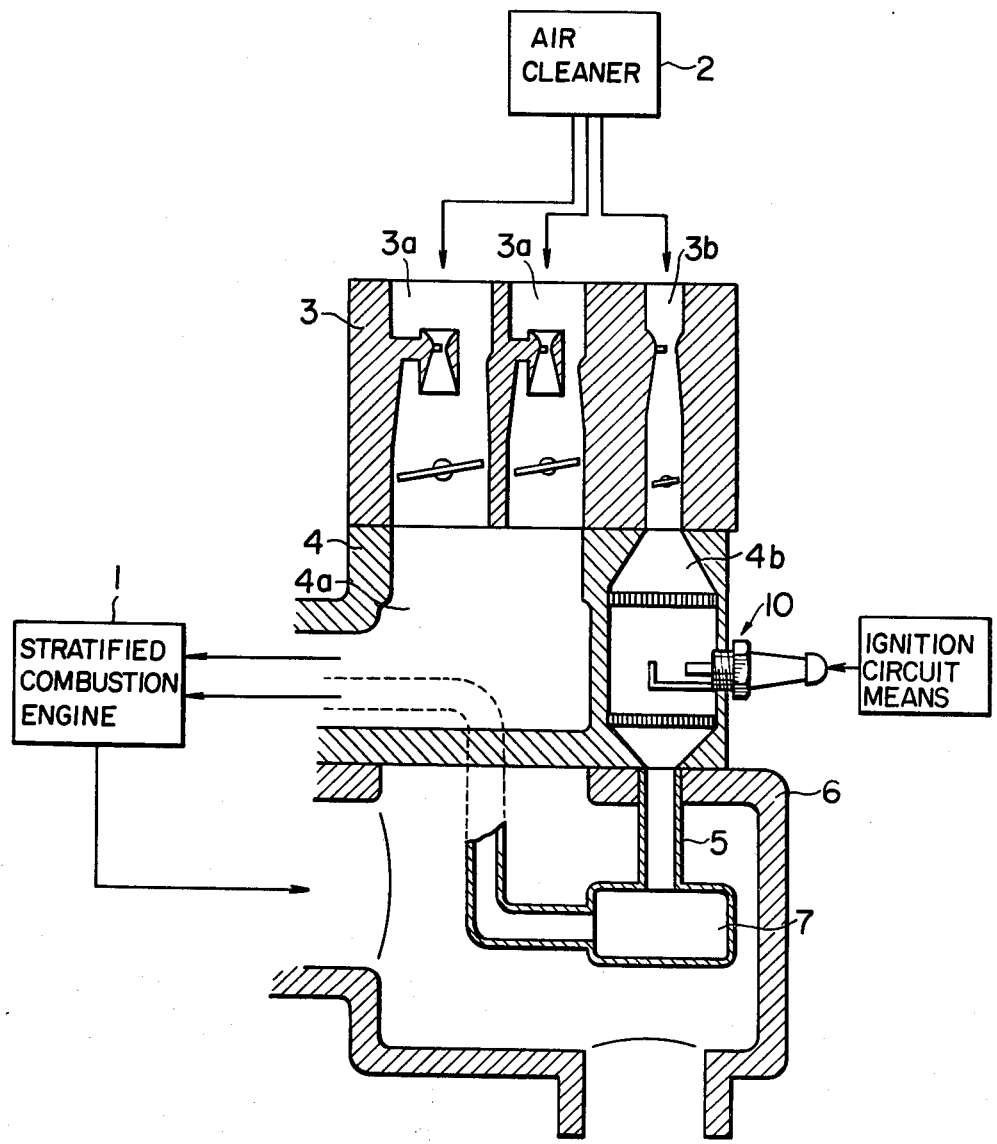
FIG. 1 shows in section an example of the application of the fuel reforming system according to the present invention to a stratified internal combustion engine.

Referring to FIG. 1, the fuel reforming system generally indicated by 10 is incorporated into a stratified combustion engine 1 having a structure illustrated, by way of example, in FIG. 1A. The engine 1 has a combustion chamber including a main combustion chamber 1a and a trap chamber 1b in which is provided a spark plug 1". The trap chamber 1b is provided with suction and discharge apertures 1c and 1d both open to the main combustion chamber 1a and wth a separating wall 1c disposed between the two apertures 1c and 1d. An intake system for introducing a lean air-fuel mixture includes an intake port 1f communicated with the main combustion chamber 1a. An intake valve 1g is provided between the intake port 1f and the main combustion chamber 1a. Another intake system for introducing a rich air-fuel mixture includes a passage 1b terminating in an end open to the intake port 1f immediately upstream of the intake valve 1g. In an intake stroke of the engine, the main combustion chamber 1a and the trap chamber 1b receive a charge of the lean air-fuel mixture from the intake port 1f and a charge of the rich air-fuel mixture from the passage 1h, respectively, to perform a stratified combustion.

Referring again to FIG. 1, the lean mixture intake system comprises an air cleaner 2, barrels 3a of a carburetor 3, a passage 4a of an intake manifold 4, the intake port mentioned above, etc. The rich mixture intake system comprises the air cleaner 2, a barrel 3b of the carburetor 3, a passage 4b in the intake manifold 4 and a conduit 5. The passage 4a of the lean mixture intake system is in heat exchange relationship with and separated from an exhaust manifold 6 by the wall of the intake manifold 4, while the conduit 5 of the rich mixture intake system is disposed within the exhaust manifold 6 so that the lean and rich mixture intake systems are both heated by exhaust gas flowing through te exhaust manifold 6. That part of the conduit 5 of the rich mixture intake system which extends through the exhaust manifold 6 is formed into a heat riser 7 to facilitate an efficient heating of the rich mixture by the exhaust gas. Gasoline which is hydrocarbon fuel is used to produce the lean and rich air-fuel mixtures. The rich mixture is at an air-fuel ratio ranging from 1 to 5.

Figure 2A:
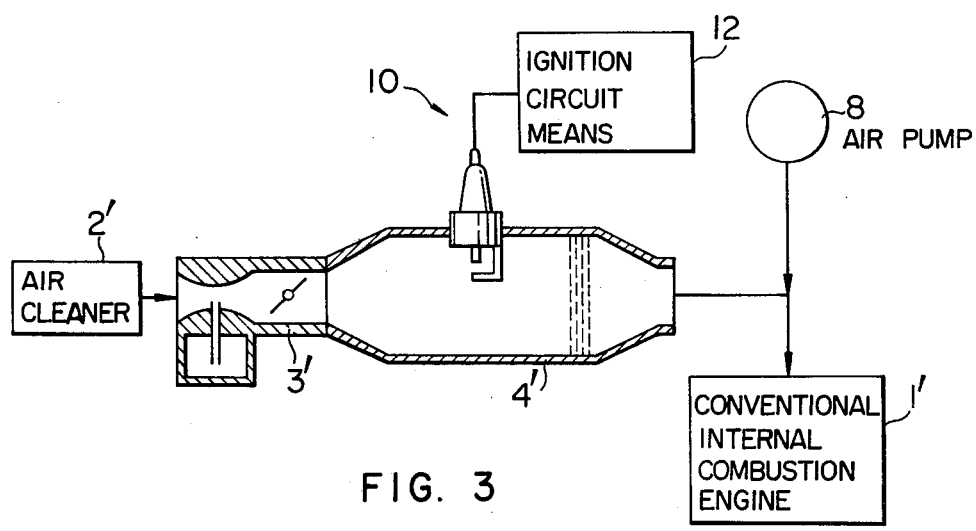
FIGS. 2A and 2B are partially sectional diagrammatic illustrations showing examples of the application o the fuel reforming system according to the present invention to conventional internal combustion engines.
Figure 2B:
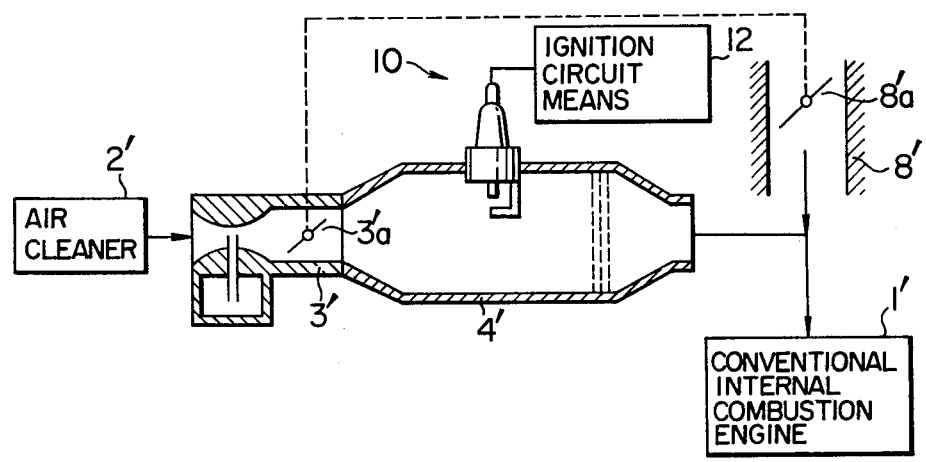

The fuel reforming system 10 has a part disposed within the passage 4b of the intake manifold 4 which passage is to introduce the rich mixture into cylinders of an associated engine. In FIG. 2A, reference numeral 1' denotes a conventional internal combustion engine having an intake system including an air cleaner 2', a carburetor 3' and an intake manifold 4'. An air pump 8 is provided to supply a fresh air to the intake system downstream of the intake manifold 4'. The carburetor 3' is so adjusted as to produce a rich mixture of air and a fuel, i.e., gasoline, at an air-fuel ratio ranging from 1 to 5. The rich air-fuel mixture is supplied with fresh air by the air pump 8 to form a mixture of a proper air-fuel ratio which is sucked into the engine 1'. Th fuel reforming system 10 according to the present invention is provided in the intake manifold 4' upstream of the point at which the freash air is supplied into the intake manifold by the air pump 8.

In FIG. 2B, numeral 1' denotes a conventional internal combustion engine which is the same as the engine shown in FIG. 2A. The engine 1' shown in FIG. 2B is equipped with an intake system similar to that shown in FIG. 2A except that the air pump 8 is replaced with a throttle body 8' which is provided with a throttle valve 8'a pivotally mounted in the throttle body 8 and operatively connected to a throttle valve 3'a of the caburetor 3' so as to control the flow of air passing through the throttle body 8'. The air the throttle body 8 is added to a rich air-fuel mixture produced by the carburetor 3' so that the rich mixture leans out to a proper air-fuel ratio and is sucked into the engine 1'. The fuel reforming system 10 according to the present invention is disposed in the intake manifold 4' upstream of the point at which the air from the throttle body 8' is fed into the intake manifold 4'.

In both cases, the parts of the intake manifolds 4' at which the fuel reforming systems 10 are disposed define therein passages of increased section areas as compared with other parts of the manifolds.

Figure 3:
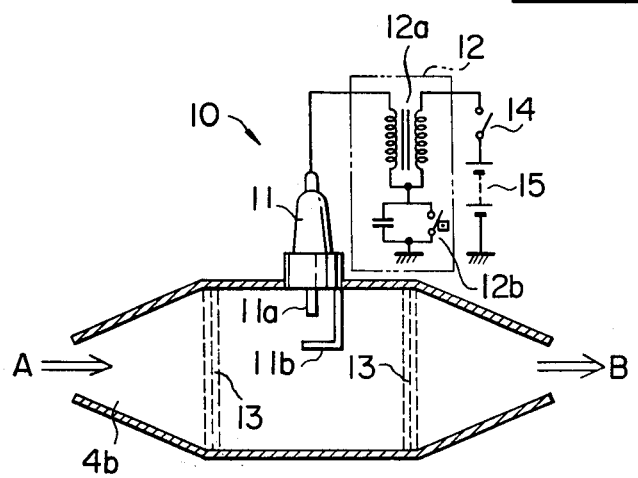
FIG. 3 is a diagrammatic view of a first embodiment of the fuel reforming system according to the present invention.

Details of embodiments of the fuel reforming system 10 according to the present invention will now be described hereunder. Referring to FIG. 3, a first embodiment of the fuel reforming system 10 includes a spark plug 11, an ignition circuit means 12 and flame arresters 13. The spark plug 11 has a central electrode 11a and an earthed electrode 11b and is adapted to receive a high voltage to produce spark discharges. The plug 11 has a structure which may be substantially the same as that of a conventional spark plug used to ignite an air-fuel mixture charge in an internal combustion engine. The electrodes 11a and 11b are positioned within the passage 4b of the intake manifold 4 shown in FIG. 1 or within the intake manifolds 4' shown in FIGS. 2A and 2B (the passage 4b and the intake manifolds 4' will be termed hereunder "passage 4b" for rich air-fuel mixture). Preferably, the spark plug 11 is mounted such that the spark gap between the electrodes 11a and 11b is positioned in an upper part of the passage 4b for the reason to be discussed later in a case where the passage 4b extends horizontally.

The ignition circuit means 12 is for intermittently supplying a high voltage to the spark plug 11 and includes an ignition coil 12a and a breaker 12b. The ignition coil 12a has its primary coil coupled through a key switch 14 to an electric power source 15 and a secondary coil coupled to the spark plug 11. The breaker 12b is so connected as to switch on and off the electrical power supply from the power source 15 to the primary coil of the ignition coil 12a. The "ON" and "OFF" operation of the breaker 12b is generally synchronized with the rotation of the engine.

The flame arresters 13 are operative to prevent propagation of flames (for example, backfire to carburetor) and, in the illustrated embodiment, are each formed of a few laminated wire screens of about 50 mesh. The flame arresters 13 are disposed within the passage 4b at upstream and downstream points spaced predetermined distances from the place at which the spark plug 11 is disposed.

With the above arrangement, the spark plug 11 is intermittently supplied with a high voltage to intermittently produce discharges between the electrodes 11a and 11b. A combustion reaction will take place on a part of a rich air-fuel mixture flowing into the passage 4b as indicated by an arrow A in FIG. 3 due to a discharge of the spark plug 11. In general, it is known that an air-fuel mixture in which a hydrocarbon fuel is uniformly atomized and mixed with air at a very rich air-fuel ratio, i.e., ranging approximately from 1 to 5, is not ignitable by a discharge of a spark plug. In fact, however, the major part of a fuel charge in a rich mixture is in liquid phase and the remainder of the fuel is atomized and mixed with the air to form an air-fuel mixture charge of an air-fuel ratio within a combustible range. Thus, a combustion reaction takes place on the atomized remainder of the fuel charge. The atomized charge of the fuel and air is separated from and positioned above the liquid phase part of the fuel due to the difference in gravity. For this reason, the electrodes 11a and 11b of the spark plug 11 are preferably disposed in the upper part of the passage 4b, as discussed above, in a case where the passage 4b is substantially horizontal.

The ignition of the air-fuel mixture by means of the discharge of the spark plug 11 causes a flame which tends to propagate both upstream and downstream. However, the flame arresters 13 prevent the flame from propagating beyond the space defined by the arresters.

The combustion of the air-fuel mixture which is very rich, i.e., at the air-fuel ratio ranging from 1 to 5, and lacks air for the perfect oxidation of the charge (however, it is believed that, because, once the combustion commences, the combustion process proceeds while the liquid phase part of the fuel is being vaporized, the mixture being burnt is not exactly of an air-fuel ratio of from 1 to 5 but of a stoichiometric air-fuel ratio) continues in such a manner that the fuel is imperfectly oxidized. Ultimately, all the oxygen is consumed and the combustion (oxidization reaction) is finished with a result that hydrogen, carbon monoxide etc are mainly produced. The process will be diagrammatically illustrated hereunder:

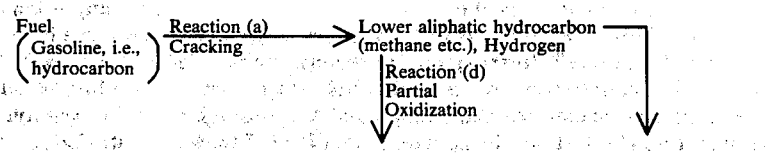

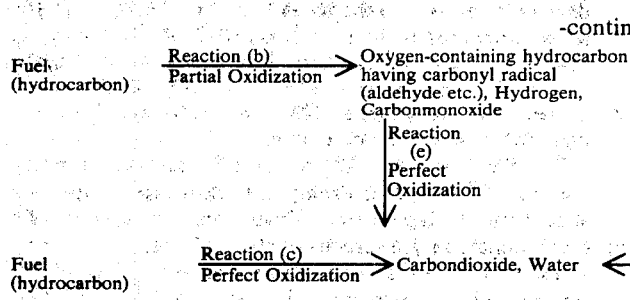

In the above process, if there is a sufficient oxygen (air) for the combustion of the fuel, the process proceeds with all the reactions (a) - (f) until the fuel is perfectly oxidized to produce carbon dioxide and water.

However, with an insufficient oxygen as is in the system according to the present invention, the reactions (a), (b) and (d), i.e., imperfect combustions, are carried out whereas the reactions (c), (e) and (f) are not carried out mostly, with a resultant production of large amounts of hydrogen, carbon monoxide, etc. (of course, a part of the fuel is left in its original form). In other words, the fuel is reformed. FIG. 4 graphically shows an example of results of tests on the components of a reformed fuel and the percentages of the respective components. The tests were made by use of a stratified combustion engine of the type shown in FIG. 1A. The rich air-fuel mixture was at an air-fuel ratio of about 3. It is apparent that a fuel reformed as such is in a more combustible state as compared with a non-reformed fuel. Namely, hydrogen, etc. are known to increase the burning velocity and improve the combustion itself and, particularly, when they are present in the vicinity of an ignition plug and a flame burning surface, they are effective to improve the ignition, buring and combustion. Hydrogen contributes to reduction and decomposition of harmful nitrogen oxides produced during a combustion. Moreover, the air-fuel mixture is heated by the heat of combustion generated by the reforming reactions, so that the part of the fuel which has been in liquid phase is vaporized. The time intervals between discharges of the spark plug 11 can be appropriately determined such that the fuel is reformed to a proper extent and the rich mixture charge is made a proper temperature.

The rich mixture charge in which a part of the fuel has been reformed and the remainder of the fuel has been vaporized, as described, flows out of the system as indicated by an arrow B in FIG. 3 and is sucked into cylinders of an associated engine. Because the fuel remains little in the form of liquid droplets in the thus reformed rich mixture, the mixture can be uniformly distributed to respective cylinders and ignited and burnt therein in quite desirable manner. The reformation and vaporization of fuel can also be reliably and effectively carried out even at a starting operation of the engine.

FIGS. 5 and 6C graphically illustrate the results of tests which have been conducted to ascertain advantages of the fuel reforming system of the present invention. Stratified combustion engines of the type shown in FIG. 1A were used for the tests.

FIG. 5 shows the results of tests on engines with an without the fuel reforming system regarding the relationship between the time required for choking (min.) in the starting operations of the engines and the ambient temperature (° C). It will be apparent from FIG. 5 that the engine equipped with the fuel reforming system of the invention needs a choking time which is extremely shorter than that required by the conventional engine. This means that the fuel was desirably reformed and vaporized by the fuel reforming system. The mark "X" in FIG. 5 indicates the temperature (−20° C) below which the engine without the fuel reforming system could not be started. On the contrary, the engine equipped with the fuel reforming system could be started even at a temperature below −30° C. From these facts, it is also apparent that the fuel reforming system according to the present invention operated to desirably reform and vaporize the fuel.

FIGS. 6A to 6C show the results of tests which have been conducted to ascertain the effect of the fuel reforming system according to the present invention after start of the engines. FIG. 6A illustrates the results of tests concerning the relationship between torque on shaft and ignition timing obtained from engines with and without the fuel reforming system of the present invention, whereas FIGS. 6B and 6C show the results of tests on the amount of nitrogen oxides ($NO_x$) and unburnt hydrocarbon (H.C.) exhausted from the engines during the tests of FIG. 6A. It will be apparent from the illustrated test results that an internal combustion engine equipped with the fuel reforming system according to the present invention produces a larger shaft torque (output) and smaller amounts of harmful exhaust gases as compared with a similar convertional engine without the system of the present invention provided with the engine equipped with the system of the invention is adequately arranged or set to meet and comply with the reforming conditions of the system. This will mean that the fuel reforming system operates to reform and vaporize a fuel to thereby enable the engine to operate in an optimum condition.

In the embodiments described, if a plurality of spark plugs are used, the range of imperfect combustion of the rich mixture of fuel will be widened to more reliably achieve the reformation and vaporization of the fuel. An embodiment designed for this purpose is shown in FIG. 7 wherein a pair of spark plugs 11 and 11' are disposed in a passage 4b and spaced a predetermined distance.

The ignition circuit means 12 of the described embodiments and ignition means for causing discharges of ignition plugs in combustion chambers of an associated engine can be made a unitary structure for the simplification of structure. The unitary structure is used to form an ignition circuit means 12 shown in FIG. 8, in which an ignition coil 12a for supplying a high voltage to a spark plug 11 is integrated into a unit with an ignition coil 12a' for supplying a high voltage to spark plugs 11" in combustion chambers of an associated engine. A cam shaft 12c of the engine is adapted to engage both of breakers 12b and 12b' for the respective ignition coils 12a and 12a'. A distributor 12d is rotated together with the cam shaft 12c in synchronism with the rotation of the engine to distribute the high voltage to respective spark plugs 11" of the combustion chambers of the engine. Numeral 12e denotes a switch.

The flame arresters 13 of the described embodiments of the invention may alternatively be made of honeycomb structures in place of wire screens. Honeycomb flame arresters more reliably prevent propagation of flames as compared with wire screen flame arresters. FIG. 9A shows an embodiment of the fuel reforming system 10 in which a downstream flame arrester 13' is made of a honeycomb structure. The honeycomb structure may be made from various kinds of materials and may have, various shapes. For example, ceramic material may be formed into honeycomb structure. In the embodiment shown in FIG. 9B, the honeycomb sturcture is made of flat sheet metals 13'a and corrugated sheet metals 13'b which are alternatively placed one on the other so that the metal sheets cooperate together to define generally triangular passages 13'c therebetween. Dimensions of the honeycomb structure, such as the thicknesses of the metal sheets 13'a and 13'b, the axial dimension of the structure (flame arrester 13') and the size of the passages 13'c may be appropriately decided to provide a desirable characteristic. In order that the flame arrester 13' may not have a too great resistance to the flow of a rich mixture and operate to surely prevent propagation of flames, it is preferred that the sheet metals 13'a and 13'b have thicknesses ranging from about 0.1 to about 0.3 mm, the axial dimension of the flame arrester 13' is larger than 10 mm and each of triangular passages 13'c is about 1 mm as measured along one of the sides of triangle. The shape of each passage 13'c is variably dependent upon the methods of manufactures. In any case, it is preferred that each passage has a size substantially equal to that of a triangular passage in which each side is 1.0 mm.

In the use of the fuel reforming system 10, if a flame caused by a discharge of the spark plug 11 propagates to the interior of engine cylinders or to a carburetor, the engine will become inoperable or a fire is caused. In general, a propagation of flame in an upstream direction will hardly ever occur because the velocity of flame propagation is less than that of the flow of an air-fuel mixture. In the case where a rich mixture intake system of an associated engine has an arrangement such that a flame does not propagate to engine cylinders is extinguished on its way by an effect of a turbulence or the like, no flame arrester is required for the system of the invention. However, if the rich mixture intake system is not so arranged as to prevent an upstream or downstream flame propagation, provision of flame arresters is of great significance for effectively avoiding any insufficient flame extinguishment. In general, there are several reasons that cause an insufficient flame extinguishment in a flame arrester. The reasons are chiefly that each of the passages in the arrester is so large as to allow a flame to pass therethrough and that the diffusion of heat from the arrester is insufficient to prevent itself from becoming red hot with a result that the arrester itself acts as a hot spot to contribute to the downstream propagation of flame beyond the arrester.

However, when the flame arrester 13' is formed of honeycomb structure, the size of each of the passages 13'c formed therein can be so decided as to provide optimum resistance to the flow of an air-fuel mixture. In addition, the honeycomb structure can provide each passage 13'c with a length (axial dimension) large enough to certainly prevent flames from propagating through the passage 13'c. A honeycomb structure made of a metal can have an appropriate heat capacity and is operative to effectively diffuse heat to an intake manifold and the like and, therefore, is prevented from getting to act as a hot spot. As a result, it is assured that downstream propagation of flames beyond the flame arrester 13' is effectively and reliably avoided to certainly prevent the engine from getting inoperable.

FIGS. 10A and 10B show a second embodiment of the present invention. On the premise that a passage 4b for rich mixture charge is horizontal, the embodiment uses a horizontal partition 16 disposed in the passage 4b to divide the same into upper and lower passages 4b-1 and 4b-2. A spark plug 11 and flame arresters 13 are disposed in the upper passage 4b-1. With this arrangement, a rich air-fuel mixture flowing into the system as indicated by an arrow A is divided into two streams which flow through the upper and lower passages 4b-1 and 4b-2 as indicated by arrows C and D and then are merged into a stream which flows out of the system as indicated by an arrow B. The rich mixture charge is divided approximately into a liquid phase part and a vapor phase part which is composed of a vaporized fuel part and air. Due to the difference in gravity, the liquid phase part and the vapor phase part are placed in the lower and upper zones of the passage 4b, respectively, as discussed in connection with the first embodiment. The vapor phase part, therefore, flows into the upper passage 4b-1 in which flame arresters 13 and a spark plug 11 are provided. Thus, the spark plug 11 is operable to reliably ignite the vapor phase part to increase the fuel reforming capability of the system and properly control the temperature of a reformed mixture indicated by the arrow B.

FIGS. 11A, 11B and 11C show a modification of the second embodiment. Plates 16' and 16", which have cut-out portions 16'a and 16"a at their lower end upper parts, respectively, are disposed within the passage 4b downstream and upstream of a spark plug 11. Horizontal partitions 16 and 18 and vertical partitions 17 and 17' are disposed in the passage 4b to divide the same into an upper passage 4b-1, a lower passage 4b-2, an annular space 4b-3 extending circumferentially around the lower passage 4b-2, and a recess 4b-4 communicating with the upper passage 4b-1 through the annular space 4b-3. The plate 16' closes an outlet end of the upper passage 4b-1 and the annular space 4b-3, while the plate 16" closes an inlet end of the annular space 4b-3 and forms an upstream end wall of the recess 4b-4. The partition 17, 17' and 18 may have at least a part possessing a heat exchange capability.

With the arrangement described, a rich mixture charge ignited by the spark plug 11 in the upper passage 4b-1 is guided by the partitions 17, 17' and 18 to flow around the lower passage 4b-2 as indicated by an arrow E to the recess 4b-4 extending though the annular space 4b-3 and, thereafter, merges with another rich mixture charge (substantial part of which is fuel) which has passed through the lower passage 4b-2, the merged mixture charges flowing out of the system as indicated by an arrow B. When the ignited and easily combustible mixture part of an elevated temperature flows as indicated by the arrow E, the heat of the mixture is transferred to the other mixture part which is mainly composed of fuel and which is passing through the lower passage 4b-2, whereby a part of the fuel of the other mixture part is vaporized by the transferred heat. The heat-exchanging partitions 17, 17' and 18 may advantageously be designed to have an appropriate heat capacity to minimize the variation in the temperature of the reformed rich mixture.

FIG. 12 shows another modification of the second embodiment. The modification comprises an addition to the second embodiment of a flame stabilizing means 19 and a flow control valve 20. The partition 16 is formed with an upwardly convex arcuate portion 16a disposed at an inlet portion of the upper passage 4b-1 to restrict the inlet portion. Preferably, the flow control valve 20 may be conveniently controlled of its opening dependent on the temperature of the reformed rich air-fuel mixture so that, when the temperature of the reformed mixture becomes higher than a predetermined temperature, the opening of the restricted inlet portion determined by the valve 20 is more restricted to allow a more limited rich mixture to flow into the upper passage 4b-1. The flame stabilizing means 19 in the illustrated embodiment comprises a member of a metal having a triangular crosssection and disposed immediately downstream of the flow control valve 20. The upper passage 4b-1 and the flame stabilizing means 19 are arranged such that the part of the passage in which the stabilizing means is disposed is given a gradually increasing sectional area as viewed downstream from the inlet portion of the upper passage 4b-1 to gradually decrease the velocity of a rich mixture flowing into and through the upper passage 4b-1 for thereby stabilizing a flame produced in the passage.

With the described arrangement, it is not only possible to stabilize a flame produced by an ignition by means of the spark plug 11 for thereby enabling the system to reliably perform its fuel reforming operation, but also unnecessary to cause the spark plug 11 to intermittently produce spark discharges many times. In addition, due to the operation of the flow control valve 20, it is possible to minimize the variation in the temperature of a refomed mixture.

The fuel reforming systems 10 of the described embodiments are arranged such that their spark plugs 11 are caused to produce spark discharges at appropriate intervals throughout the operations of associated engines. However, it is desirable to stop the spark-discharge in some cases, for example, when warm-up of an associated engine has been completed, or when the temperature of a rich mixture at a point downstream of the fuel reforming system has reached a predetermined high temperature. The stratified combustion engine shown in FIG. 1 is so constructed that the conduit 5 of the rich mixture intake system is heated by exhaust gases. Also in the conventional internal combustion engines 1' shown in FIGS. 2A and 2B, arrangements are usually employed such that the intake manifolds 4' are heated by exhaust gases, although the arrangements are not shown. With such arrangements, when the engines 1 and 1' have been warmed up, the exhaust gases get a temperature sufficiently high enough to achieve by themselves the vaporization of the fuel parts of rich mixtures. If, at such time, the spark plugs 11 of the fuel reforming systems are energized to cause spark discharges, a part of the rich mixture is caused to burn to consume the fuel and, in addition, the reformed rich mixture is heated to an unduly high temperature. Of course, if the fuel reforming condition is set optimum, the fuel reforming treatment can advantageously result as exemplified by the test results shown in FIGS. 6A to 6C. If is well known that heating of the rich mixture to an unduly high temperature will cause a decrease in the volumetric efficiency of the engine with a decrease in the output thereof. In order to certainly prevent the rich mixture from being heated to unduly high temperature, the discharge of the spark plug 11 should be controlled in accordance with the temperature of the rich mixture at a point downstream of the spark plug 11 (i.e. the temperature of the rich mixture at which it is sucked into the engine.).

FIG. 13 shows a third embodiment of the present invention and FIG. 14 a modification thereof. The arrangement of the embodiment shown in FIG. 13 is such that the discharge of spark plug 11 is controlled in accordance with the warm-up state of an associated engine, whereas the arrangement of the modified embodiment shown in FIG. 14 is such that the discharge is controlled according to the temperature of a rich mixture.

In FIG. 13, the temperature of water for cooling the engine is employed as a medium for detecting the warm-up state of the engine. For this purpose, a temperature sensor 21 such as a thermistor or a thermocouple is disposed in a cooling water passage 9 in the engine. The temperature sensor 21 emits a signal to an ignition controlling means 22 which compares the signal with a pre-set value to control the operation of an ignition circuit means 12.

In FIG. 14, a temperature sensor 21' such as a thermistor or a thermocouple is disposed in a rich mixture passage 4b downstream of a downstream flame arrester 13. The temperature sensor is connected to an ignition controlling means 22' which is similar to the ignition controlling means 22 in FIG. 13 and which is connected to an ignition circuit means 12 to control the operation thereof.

An example of circuit arrangements of the ignition controlling means 22 and 22' is shown in FIG. 15. The circuit shown utilizes as the temperature sensor 21 (21') a thermistor having a negative resistance-temperature characteristic. The ignition controlling means 22 (22') includes an amplifier 23 for amplifying a signal from the thermistor 21 (21'), a comparator 26 for comparing a signal from the amplifier 23 with a pre-set value which is determined by the ratio between the resistance of resistors 24 and 25, a first transistor 27 adapted to be switched "ON" or "OFF" in accordance with a signal from the comparator 26, a second transistor 28 adapted to be switched "OFF" when the transistor 27 is in an "ON" state and adapted to be switched "ON" when the transistor 27 is in an "OFF" state, and solenoid 29 adapted to be energized and deenergized when the transistor 28 is switched "ON" and switched "OFF", respectively.

In the ignition circuit means 12, a switch 30 is disposed in series with the key switch 14 between the primary coil of the ignition coil 12a and the power source 15. The switch 30 is operated by the operation of the solenoid 29 of the ignition controlling means 22 (22') so that the switch 30 is closed when the solenoid 29 is energized.

With the arrangement shown in FIG. 13, when the engine has been warmed up and the cooling water is heated to a predetermined temperature, the operation of the ignition circuit means 12 is stopped to interrupt the discharge of the spark plug 11 for thereby preventing uneconomical fuel consumption and rise of rich mixture to an unduly high temperature. Therefore, the decrease of the volumetric efficiency of the engine is prevented. With the arrangement shown in FIG. 14, the rich mixture can be kept within a proper temperature range.

FIG. 16 shows a fourth embodiment of the present invention. A fuel reforming system 10 is designed such that a secondary air of an amount determined according to the vacuum within a rich mixture passage 4b is supplied into the passage at a point upstream of a spark plug 11 in order that the reforming and vaporization of the fuel by means of the discharge of the spark plug may be achieved at a substantially constant rate throughout all of the operating conditions of an associated engine. For this purpose, the embodiment utilizes a secondary air intake pipe 31 having an open end disposed in the passage 4b upstream of the spark plug 11 but downstreams of an upstream flame arrester 13. The other end of the pipe 31 is open to the interior of an air cleaner 2. It is particularly preferred that the open end of the pipe 31 is open immediately upstream of the spark gap of the spark plug 11.

In general, vaporization of liquid is increased as pressure is decreased (vacuum is increased) if temperature is assumed to be constant. Accordingly, when the vacuum within the passage 4b is small, the vaporization of the fuel is poor, so that a mixture part consisting of a vaporized part of the fuel of a rich mixture and the air of the rich air-fuel mixture is maintained at an air-fuel ratio within a range ignitable by the spark plug 11 with a result that the reformation and vaporization of the fuel by means of imperfect combustion is achieved. However, if the vacuum within the passage 4b gets as large as more than $-300$ mmHg, the fuel is greatly vaporized with a result that a mixture part consisting of the thus vaporized part of the fuel of the rich mixture and the air of the rich mixture becomes richer than the ignitable air-fuel ratio and can hardly be ignited by the spark plug 11.

With the arrangement shown in FIG. 16, a secondary air is sucked into the passage 4b upstream of the spark plug 11 in accordance with the magnitude of the vacuum within the passage. In other words, when the vacuum is so small and the vaporization of the fuel is so poor that a mixture part consisting of the air of a rich mixture and the vaporized part of the fuel of the rich mixture is within an ignitable range of air-fuel ratio, a small amount of secondary air is sucked into the passage 4b. The amount of secondary air to be sucked into the passage is increased as the vacuum is increased to facilitate the vaporization of fuel so that the mixture part consisting of the air of the rich mixture and the vaporized part of the fuel is enriched. Thus, an air-fuel mixture consisting of the vaporized fuel, the air of the rich mixture and the secondary air thus sucked-in is always maintained within an ignitable range of air-fuel ratio regardless of the magnitude of the vacuum within the passage 4b whereby it is assured that reformation of a part of fuel of the rich mixture and vaporization of remaining fuel by means of an imperfect combustion of the rich mixture is reliably achieved. Accordingly, inpaction of liquid fuel to the walls of the mixture passages and flow of liquid fuel on the walls of the mixture passages and the cylinder walls are prevented to reliably achieve the introduction of rich mixture to engine cylinders in an optimum state for thereby facilitating the engine operation at an optimum condition.

Preferably, the secondary air supply may be controlled according to the vacuum within the rich mixture passage 4b and, in addition, the amount of the rich mixture supplied. For this purpose, the secondary air intake pipe 31 may be provided with a flow variable orifice (not shown). The degree of the opening of the orifice may preferably be controlled in accordance with the degree of the opening of the throttle valve in the rich mixture passage 4b so that the supply of the secondary air is in proportion to the amount of the rich mixture supplied.

In a case where a secondary air intake pipe is used, as described above, the pipe can be arranged to act as an earthed electrode of a spark plug. An example of such arrangement is shown in FIG. 17. In this arrangement, the system is provided with a spark plug 11''' which has a central plug 11''' a only. An earthed electrode to be cooperative with the central electrode is formed by a secondary air intake pipe 31.

In general, electrodes of spark plug are exposed to a high temperature and tend to be red hot. If the electrodes of the spark plug remain heated red hot even after the completion of a spark discharge, the red hot electrodes act as hot spots to continue imperfect combustion of a rich mixture, which heats the rich mixture to a high temperature beyond a predetermined desired temperature. This makes it impossible to properly control the temperature of the rich mixture and, accordingly, adversely affects proper combustion in engine cylinders. In fact, with the normal spark plugs 11 used in the respective embodiments described above, the earthed electrodes 11b receive a larger amount of heat than that released therefrom by virtue of conduction of heat with a result that the electrodes tend to be heated red hot to form hot spots.

With the arrangement shown in FIG. 17, however, spark discharges are caused between the spark plug 11''' and the secondary air intake pipe 31 to perform the reformation and vaporization of fuel contained in a rich mixture. Because air flows through the secondary air intake pipe 31, the same is sufficiently cooled by the air so that the pipe cannot be heated to red hot even if the pipe is exposed to flames. Thus, no part forms a hot spot and there will never occur a condition that a combustion of a rich mixture is continued after a discharge by the spark plug 11'''.

FIG. 18 shows a fifth embodiment of the invention which is characterized by a mixer for insuring mixing of a rich air-fuel mixture with a secondary air sucked through a secondary air intake pipe 31. The mixer is also operative to define the range of the imperfect combustion of the rich mixture and effectively utilize the secondary air. More particularly, downstream of the secondary air intake pipe 31 is provided the mixer 32 of a sleeve-like shape having a diameter much greater than that of the pipe 31 and provided with a plurality of apertures 32a formed in the peripheral wall. The secondary air intake pipe 31 has a trumpet-like diverging end (open end) disposed near to or in contact with the mixer 32. A spark plug 11''' used in the embodiment is of the type that has only one electrode 11''' a disposed substantially axially centrally of the mixer 32 and having its tip positioned substantially in the same plane as the inner peripheral surface of the mixer. An earthed electrode 11'''b is also disposed substantially axially centrally of the mixer 32 in diametrically opposite relationship with the first electrode 11''' a and has a tip positioned substantially in the same plane as the inner peripheral surface of the mixer.

With the arrangement described, a secondary air sucked into through the secondary air intake pipe 31 flows into the mixer 32 and is substantially uniformly distributed therein because of the trumpet-like diverging configuration of the open end of the pipe 31 and of the mixer 32. A rich air-fuel mixture flows into the mixer 32 through the apertures 32a therein and is uniformly mixed with the secondary air within the mixer 32 to form a mixture. It is therefore possible to cause a stable ignition and combustion within the mixer 32 by means of a discharge produced between the electrode 11′′′ a of the spark plug 11′′′ and the earthed electrode 11′′′ b to thereby facilitate reformation and vaporization of the fuel. An imperfect combustion of the rich mixture takes place within the mixer 32 to generate a heat by which a part of the rich mixture outside the mixer is heated and the fuel is vaporized. Since the secondary air flows into the mixer 32 only, as described previously, the air is effectively used for the imperfect combustion. In addition, as the tips of the electrodes 11′′′ a and 11′′′ b are positioned substantially in the same place as the inner peripheral surface of the mixer 32, the tips do not form any hot spot but properly operate to the required end.

Modifications of the arrangement of the secondary air intake pipe 31 and the mixer 32 of the fifth embodiment are shown in FIGS. 19A to 19D. In the modification shown in FIG. 19A, a simple sleevelike mixer 32 (without apertures) is provided downstream of and spaced a distance from a trumpet-like open end of a secondary air intake pipe 31. Spark plugs 11′′′ and 11′′′ b are disposed downstream of the mixer 32 in diametrically opposite relationship with each other. A rich mixture flows into the mixer 32 through a gap defined between the open end of the secondary air intake pipe 31 and the mixer and is mixed with a secondary air therein.

Figure 19A:
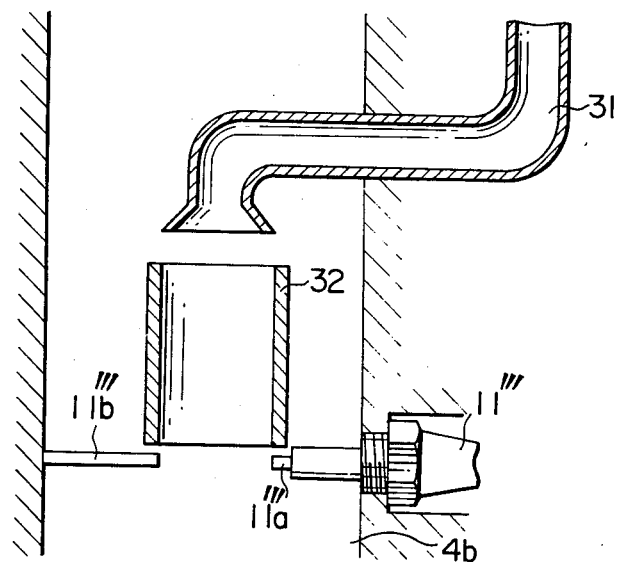
Figure 19B:
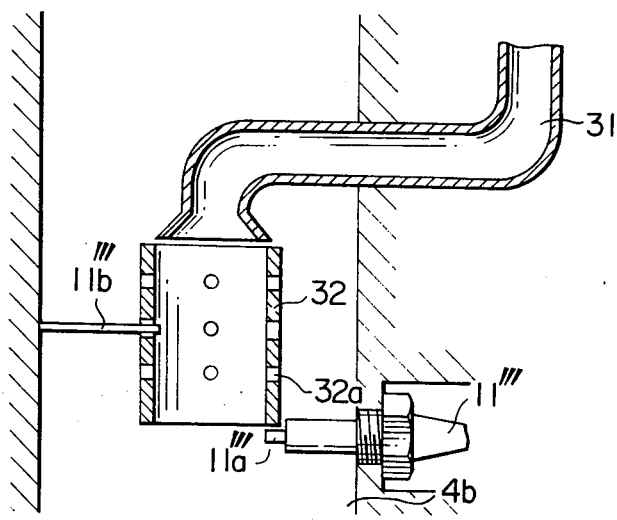

The arrangement shown in FIG. 19B is substantially the same as that shown in FIG. 18 except the feature that an ignition plug′′′ is disposed immediately downstream of a mixer 32. The plug 11′′′ has an electrode 11′′′ a positioned substantially in the same plane as the inner peripheral surface of the mixer 32.

Figure 19C:
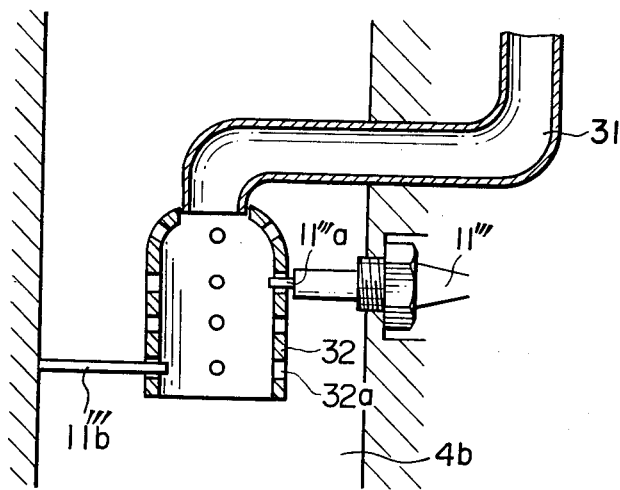

In the arrangement shown in FIG. 19C, a secondary air intake pipe 31 has an open end which is not divergent. Instead, a sleeve-like mixer 32 used in the modification has an upstream end gradually converging toward the open end of the pipe 31 to surround the open end and is formed with a plurality of apertures in the peripheral wall. A spark plug 11′′′ is disposed in an axially central position of the mixer 32 whereas another eathed electrode is disposed downstream of the plug 11′′′.

Figure 19D:
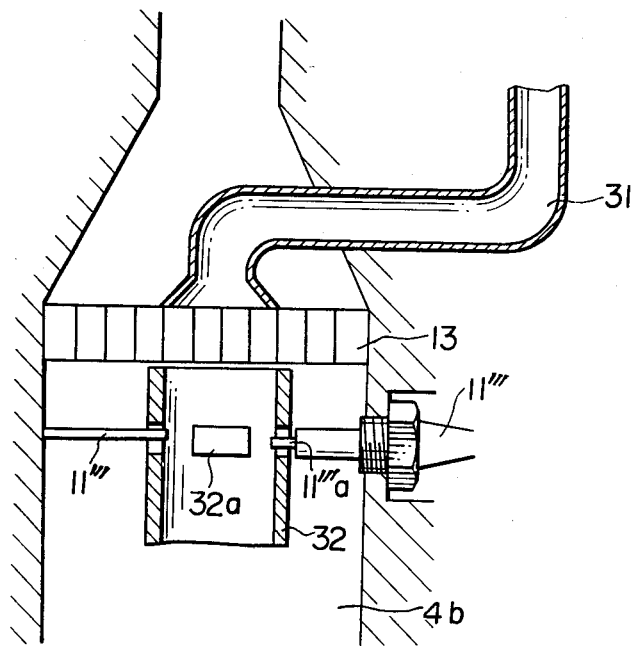

In the arrangement shown in FIG. 19D, a secondary air intake pipe 31 has its trumpet-like open end disposed near to or in contact with an upstream flame arrester 13, while a mixer 32 is disposed downstream of the arrester 13 so that the upstream end of the mixer 32 is positioned adjacent to or in contact with the arrester 13. The mixer is provided with a plurality of apertures 32a formed in an axially intermedate portion of the peripheral wall of the arrestor and arranged circumferentially of the mixer. A spark plug 11′′′ and an earthed electrode 11′′′ b are disposed in opposite relationship and have tips positioned in the apertures 32a in the mixer 32.

Some modifications of the mixer 32 are shown in FIGS. 20A to 20E and FIG. 20F and 20J. The modified mixer 32 shown in FIGS. 20A (a) and (b) 20F has a tapered shape and may be formed with apertures in the peripheral wall. Preferably, the mixer is installed such that an upstream end of the mixer having the smaller diameter is disposed in opposite relationship to the open end of the secondary air intake pipe.

Figure 20A:
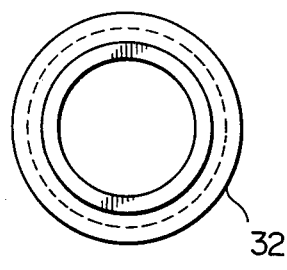
Figure 20F:
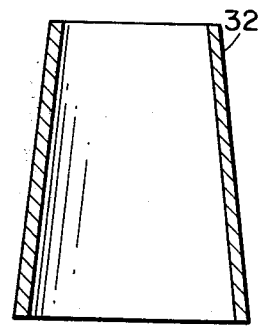
Figure 20B:
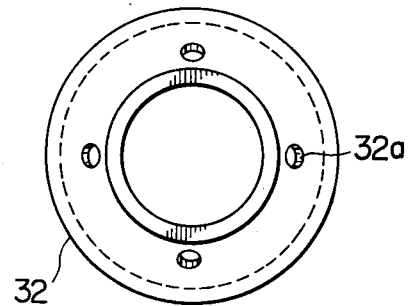
Figure 20G:
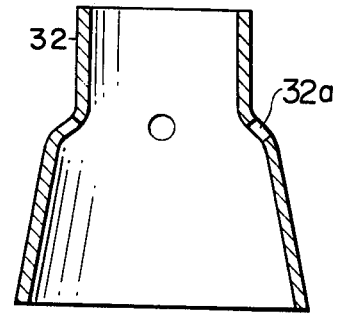
Figure 20E:
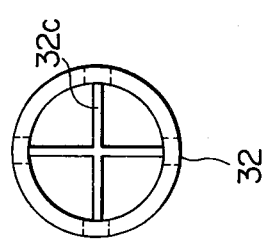

The modified mixer 32 shown in FIGS. 20E FIG. 20G has a cylindrical portion and a tapered portion connected thereto by an annular shoulder portion. A plurality of apertures are formed in the shoulder portion and arranged circumferentially of the mixer. The mixer may preferably be disposed such that the outer end of the cylindrical portion is positioned in opposite relationship to the open end of the secondary air intake pipe.

Figure 20J:
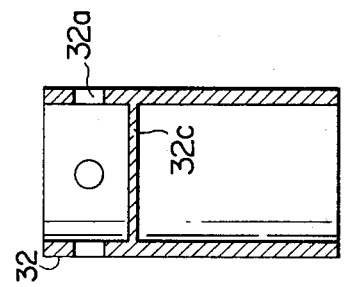
Figure 20D:
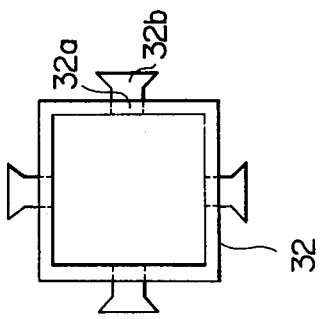
Figure 20I:
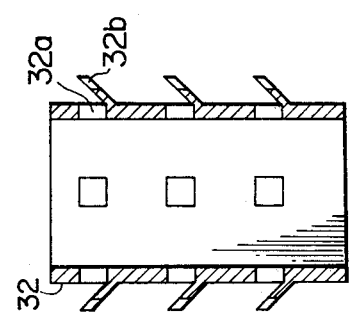
Figure 20C:
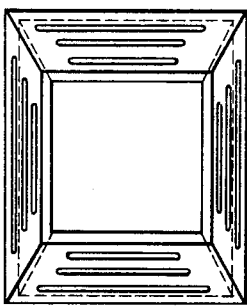
Figure 20H:
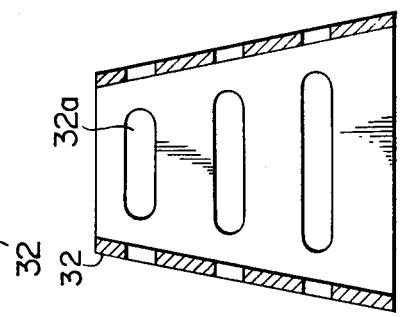

The modified mixer 32 shown in FIGS. 20C 20H has a square cross-section and is tapered to form a trapezoid in side elevation. A plurality of apertures 32a are formed in the side walls of the mixer 32. Also in this case, the mixer 32 is preferably so installed that the smaller open end of the mixer is positioned in opposite relationship to the open end of the secondary air intake pipe.

The modified mixer 32 shown in FIGS. 20D and 20I comprises an open-ended hollow body having a square cross-section and provided with a plurality of apertures 32a formed in the side walls. The mixer 32 is provided with guide plates 32b each disposed at adjacent position of one of the apertures 32a and obliquely projecting from the mixer 32 generally toward an inlet end of the mixer 32. The mixer 32 may be installed such that the inlet end is positioned in opposite relationship to the open end of the secondary air intake pipe so that a rich air-fuel mixture is guided by the guide plates 32b into the mixer 32. The mixer may alternatively have a circular cross-section instead of the square one.

The modified mixer 32 shown in FIGS. 20E and 20J comprises a substantially cylindrical sleevelike member provided with a plurality of circumferentially arranged apertures 32a formed in the peripheral wall adjacent to one end of the member. The mixer 32 is adapted to be installed such that the one end is positioned in opposite relationship to the open end of the secondary air intake pipe. The mixer 32 has a cross member 32c provided in the cylindrical interior of the mixer downstream of the apertures 32a for facilitating uniform mixture of a rich air-fuel mixture with a secondary air by means of turbulence produced by the cross member.

FIGS. 21A and 21B show a sixth embodiment of the present invention. The embodiment is designed such that the supply of a secondary air is controlled in accordance with the temperature of a cooling water for an associated internal combustion engine. A control valve 33 is provided in a secondary air intake pipe 31. A thermo-switch 21′′ is provided in a cooling water passage 9 of the engine. In the illustrated embodiment of the invention, the control valve 33 comprises a solenoid valve adapted to be opened and closed to control the secondary air supply to a rich mixture passage 4b. The thermo-switch 21′′ may comprise a bimetal switch or a wax switch which is sensitive to the temperature of the cooling water and is switched on and off. The thermo-switch 21′′ is disposed in a circuit in series with a coil of the solenoid valve 33 and a power source 15 so that the energization and deenergization of the solenoid valve 33 by the power source 15 and hence the supply of the secondary air to the rich mixture passage 4b are controlled by the "ON" and "OFF" operation of the thermo-switch 21′′. The arrangement is such that, when the cooling water is heated to a temperature beyond a predetermined temperature, the secondary air intake pipe 31 is blocked to interrupt the secondary air supply to the passage 4b. The pipe 31 terminates in an open end disposed upstream of an upstream flame arrester 13. A mixer 32 is formed by a hollow cylindrical body having a plurality of projections 32b' disposed adjacent to the upstream end of the body and projecting radially inwardly from the inner peripheral surface thereof.

The secondary air supply is controlled in the embodiment for a reason similar to that discussed in connection with the embodiment shown in FIG. 13. It will be apparent to those in the art that the secondary air supply and the discharge of a spark plug can both be controlled for an improved result. The warm-up state of the engine may be detected from the temperature of exhaust gas from the engine other than from the temperature of cooling water or may be detected from both. It will also be apparent that the secondary air supply is not necessarily required to be controlled in a complete "ON" and "OFF" fashion and may be controlled such that the amount of the secondary air supply is increased or decreased in accordance with the warm-up state of the engine.

FIG. 22 shows a modification of the sixth embodiment, in which the secondary air supply is controlled in accordance with the temperature of a rich mixture. A temperature sensor 21' detects the temperature of the rich mixture and emits a signal to a secondary air supply controlling means 34 which is operative to control the electric supply to a flow control valve 33 formed by a solenoid valve. The secondary air supply controlling means 34 may have an arrangement and structure exactly the same as those of the controlling means 22 or 22' shown in FIG. 15. The solenoid valve 33 is so controlled as to block a secondary air intake pipe 31 when the temperature of a rich mixture detected by the temperature sensor 21' rises above a predetermined temperature.

FIGS. 23, 24 and 25 show a seventh embodiment of the invention which is designed to perform reforming and vaporization of fuel by means of discharge of a spark plug and action of oxidized catalyst. In order that the fuel reforming and vaporizing treatment may be effectively carried out, water is sprayed into a rich air-fuel mixture to maintain the catalyst at a temperature within a proper range. More specifically, a catalyst bed 35 is provided in a rich mixture passage 4b downstream of a spark plug 11''' and of a downstream flame arrester 13. The catalyst bed 35 may preferably comprise a catalyst carrier formed of a ceramic material in the form of pellets or a honeycomb structure and an oxidized catalyst carried by the carrier and consisting of an oxide of a noble metal element such as platinum or of a base metal element such as copper or chromium. Alternatively, the catalyst bed 35 may be formed of a single body formed of one of the above-mentioned metals.

A temperature sensor 36 in the form of a thermistor or a thermocouple extends into the catalyst bed 35. In a rich mixture intake system of an associated engine, a water spraying orifice 37 is open to a venturi of a barrel 3b of a carburetor 3 and communicated by means of a water conduit 38 with a water tank 39 which is adapted to contain an amount of water. A control valve 40 in the form of a solenoid valve is provided in the water conduit 38 and adapted to be controlled of its opening and closing operation by a water supply controlling means 41 which is operative to compare a signal from the temperature sensor 36 with a pre-set value. The arrangement is such that, when the temperature of the catalyst bed 35 detected by the temperature sensor 36 rises beyond a predetermined temperature, the controlling means 41 operates to open the solenoid valve 40. The controlling means may have an electrical circuit system similar to that of the controlling means 22 (22') shown in FIG. 15. Preferably, a hysteresis may be provided between the opening and closing operations of the control valve 40.

With the arrangement described, fuel is reformed and vaporized by the operation of the catalyst bed 35 alone or in combination with the fuel reforming operation by means of discharge of the spark plug 11'''. An imperfect combustion of a rich air-fuel mixture takes place because parts of the air and fuel are caused to react with each other due to the catalytic action of the oxidized catalyst.

The catalytic reforming of fuel has a prerequisite that the catalyst bed 35 is maintained at a temperature within an optimum range which varies with kinds of catalysts but generally has an upper limit of about 500° C and a lower limit of about 250° C. Because a discharge of the spark plug 11''' causes an imperfect combustion of the rich mixture, the same is quickly heated and, thus, the catalyst bed 35 is easily heated to a temperature higher than 250° C. When the temperature of the catalyst bed 35 becomes higher than a predetermined temperature, for example, 500° C, the control valve 40 is opened to cause water to be sprayed into and absorbed by the rich mixture. The thus absorbed water reaches the catalyst bed 35 to cool the same. When the temperature of the catalyst bed 35 is lowered to the lower limit of the rich optimum temperature range, the control valve 40 is closed to stop the water supply to the mixture. The operation is reaped to maintain the catalyst bed 35 within the optimum temperature range for the optimum catalytic action.

The water tank 39 may be refilled with water when a supply of water in the tank has been consumed. The refilling, however, is troublesome and will be impossible when the engine is used on a vehicle. In such a case, water contained in the exhaust gas from the engine will conveniently be condensed and supplied to the water tank 39. An example of such a system is shown is FIG. 25. The system includes a cooling chamber 42 forming a part of an exhaust pipe 6 of an engine. The cooling chamber 42 is provided with heat radiation fins 43 for facilitating cooling of the exhaust gas. The exhaust gas entered into the cooling chamber 42 is cooled therein, so that the water contained in the exhaust gas is condensed and flows into a drain pipe 44 connected to a bottom of the cooling chamber 42 and is open to a tank 45. Thus, the water flows into the tank 45 and is pumped into the water tank 39 shown in FIG. 23 by means of a pump 46. The system is effectively automatically refill the water tank 39 with water and eliminates the requirement for supply of water to the water tank from outside of the vehicle.

What we claim is:

1. A fuel reforming system for an internal combustion engine operable with a hydrocarbon fuel comprising:
    a passage for a rich mixture of air and the fuel,
    at least a single spark plug disposed in said passage for imperfectly burning a part of said rich mixture in said passage to reform and vaporize the fuel contained in said rich mixture,
    a secondary air intake pipe having an open end disposed in said passage upstream of said spark plug for supplying a secondary air to said passage, and means for controlling said imperfect burning of said rich mixture.

2. A fuel reforming system for an internal combustion engine as claimed in claim 1, wherein said controlling means comprises a temperature sensor for detecting the temperature of said fuel reforming system, whereby said imperfect burning of said rich mixture is controlled in response to the output signal of said temperature sensor.

3. A fuel reforming system for an internal combustion engine as claimed in claim 2, wherein said controlling means further comprises means for controlling the amount of said secondary air to be supplied from said secondary air intake pipe in response to the output signal of said temperature.

4. A fuel reforming system for an internal combustion engine as claimed in claim 3, further comprising a mixer fixed in said passage to define a limited space therein for mixing said secondary air with said rich mixture sufficiently thereby to obtain a stable imperfect combustion of said rich mixture in said mixer.

5. A fuel reforming system for an internal combustion engine as claimed in claim 2, further comprising first flame arresting means disposed in said passage downstream of said spark plug for preventing a flame produced by said spark plug from propagating downstream.

6. A fuel reforming system for an internal combustion engine as claimed in claim 5, further comprising second flame arresting means disposed in said passage upstream of said spark plug for preventing said flame from propagating upstream.

7. A fuel reforming system for an internal combustion engine having a cylinder, a cylinder head cooperating with said cylinder to define a main combustion chamber, an intake port for introducing a lean mixture to said main combustion chamber, a trap chamber communicated with said main combustion chamber, a first spark plug exposed to said trap chamber, and a passage for feeding a rich mixture, said passage having an open end disposed in said intake port and being directed to said trap chamber so that the rich mixture is introduced therefrom into said trap chamber, said fuel reforming system comprising: a second spark plug disposed in said passage for imperfectly burning a part of said rich mixture to reform and vaporize the fuel contained in said rich mixture, a secondary air intake pipe having an open end disposed in said passage upstream of said second spark plug for supplying a secondary air to said passage, and means for controlling the amount of said secondary air to be supplied from said secondary air intake pipe in accordance with the temperature of the fuel reforming system.

8. A fuel reforming system for an internal combustion engine as claimed in claim 7, wherein said trap chamber further comprises means disposed between said suction and discharge apertures in said trap chamber for partially separating said trap chamber, thereby to direct said rich mixture toward said first spark plug.

9. A fuel reforming system for an internal combustion engine as claimed in claim 7, further comprises a heat riser disposed downstream of said second spark plug for heating said imperfectly burned rich mixture, thereby facilitating the burning of said rich mixture supplied into said trap chamber.

* * * * *